(12) United States Patent
Benedetto et al.

(10) Patent No.: US 10,880,755 B2
(45) Date of Patent: Dec. 29, 2020

(54) METHOD AND SYSTEM FOR RADIO COMMUNICATION NETWORK PLANNING

(71) Applicant: Telecom Italia S.p.A., Milan (IT)

(72) Inventors: Andrea Benedetto, Turin (IT); Giuseppe Bussolino, Turin (IT); Emanuele Gilio, Turin (IT); Roberto Lanzo, Turin (IT); Alessandro Leoni, Turin (IT); Simone Piacco, Turin (IT); Loris Paolo Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 16/343,123

(22) PCT Filed: Oct. 21, 2016

(86) PCT No.: PCT/EP2016/075355
§ 371 (c)(1),
(2) Date: Apr. 18, 2019

(87) PCT Pub. No.: WO2018/072840
PCT Pub. Date: Apr. 26, 2018

(65) Prior Publication Data
US 2019/0320326 A1  Oct. 17, 2019

(51) Int. Cl.
*H04W 4/00* (2018.01)
*H04W 16/18* (2009.01)

(52) U.S. Cl.
CPC .................................. *H04W 16/18* (2013.01)

(58) Field of Classification Search
None
See application file for complete search history.

(56) References Cited

U.S. PATENT DOCUMENTS 8,780,174 B1 * 7/2014 Rawdon ............. H04N 5/23267
348/43
9,711,126 B2 * 7/2017 Mehra ..................... A63F 13/60
(Continued)

FOREIGN PATENT DOCUMENTS

EP 1292163 A1 3/2003

OTHER PUBLICATIONS

Sep. 5, 2017—(WO) International Search Report and Written Opinion—PCT/EP2016/075355.

(Continued)

*Primary Examiner* — Gerald A Smarth
(74) *Attorney, Agent, or Firm* — Banner & Witcoff, Ltd.

(57) ABSTRACT

A method of planning deployment of a radio communication network in at least a portion of a geographic area is provided. The method comprises: providing a three-dimensional model of the at least a portion of the geographic area; providing a model of at least one radio base station, the model comprising at least an indication of a position of the radio base station within the geographic area; and evaluating a propagation channel within the at least a portion of the geographic area associated with electromagnetic radiation, radiated by the at least one radio base station, at predetermined positions in the three-dimensional model of the geographic area. The method further comprises planning the deployment of the radio communication network based on the evaluation of the propagation channel.

18 Claims, 16 Drawing Sheets

(56) References Cited

U.S. PATENT DOCUMENTS

| | | | |
|---|---|---|---|
| 2003/0023412 A1* | 1/2003 | Rappaport | H04W 16/20 703/1 |
| 2004/0133415 A1* | 7/2004 | Rappaport | H04L 41/145 703/22 |
| 2006/0019679 A1* | 1/2006 | Rappaport | G01S 5/0252 455/456.5 |
| 2009/0244058 A1* | 10/2009 | Purcell | G06T 15/06 345/418 |
| 2010/0135178 A1* | 6/2010 | Aggarwal | G01S 5/14 370/252 |
| 2011/0287778 A1* | 11/2011 | Levin | H04W 64/006 455/456.1 |
| 2012/0062419 A1 | 3/2012 | Yoon | |

OTHER PUBLICATIONS

Fernando Aguado Agelet et al, "Efficient Ray-Tracing Acceleration Techniques for Radio Propagation Modeling", IEEE Transactions on Vehicular Technology, IEEE Service Center, Piscataway, NJ, US,vol. 49, No. 6, Nov. 1, 2000 (Nov. 1, 2000), XP011064150.

Degli-Esposti et al, "Speed-Up Techniques for Ray Tracing Field Prediction Models", IEEE Transactions on Antennas and Propagation, IEEE Service Center, Piscataway, NJ, US,vol. 57, No. 5, May 1, 2009 (May 1, 2009), p. 1469-1480, XP011257146.

Younhyun Park et al, "Improving the acceleration of ray tracing estimation in an urban environment", Microwave Conference, 2008. APMC 2008. Asia-Pacific, IEEE, Piscataway, NJ, USA,Dec. 16, 2008 (Dec. 16, 2008), p. 1-6, XP031636516.

R. Hoppe, G. Wölfle, and F.M. Landstorfer, "Fast 3D Ray Tracing for the Planning of Microcells by Intelligent Preprocessing of the Database", 3rd European Personal and Mobile Communications Conference (EPMCC) 1999, Paris, Mar. 1999.

R. Hoppe, P. Wertz, G. Wölfle, and F.M. Landstorfer, "Fast and Enhanced Ray Optical Propagation Modeling for Radio Network Planning in Urban and Indoor Scenarios", MPRG Wireless Personal Communications Symposium 2000, Blacksburg (Virginia, USA), Jun. 14-16, 2000.

R. Hoppe, "An Introduction to the Urban Intelligent Ray Tracing (IRT) Prediction Model", AWE Communications GmbH, 2005.

Propagation data for the terrestrial land mobile service in the VHF and UHF bands, Recommendation ITU-R p. 1145, 1995.

J. B. Keller, "Geometrical Theory of Diffraction", Journal of the Optical Society of America, vol. 52, N. 2, pp. 116-130, 1962.

R.G. Kouyoumjian, P.H. Pathak, "A Uniform Geometrical Theory of Diffraction for an Edge in a Perfectly Conducting Surface", Proceedings of the IEEE, vol. 62, N. 11, Nov. 1974.

* cited by examiner

METHOD AND SYSTEM FOR RADIO COMMUNICATION NETWORK PLANNING

BACKGROUND OF THE INVENTION

Field of the Invention

The present invention refers to communication systems. More particularly, the present invention relates to the field of wireless or radio communication networks. In detail, the present invention refers to a method and a system for radio communication network planning.

Overview of the Related Art

As known, a generic radio communication network comprises a plurality of Radio Base Stations, or RBSs, which are distributed over a geographic area to be served by the radio communication network in order to allow communications of User Equipment, UE (e.g., mobile telephones, smartphones etc.), within the geographic area.

Particularly, in urban and suburban environments each RBS of the radio communication network may be provided either above or below an average height of the rooftops.

Consequently, the electromagnetic radiation emitted by the RBS propagating to a generic point in the geographic area may interact with a plurality of obstacles (e.g., portions of building and/or other artefacts), e.g. according to reflection and/or refraction principles.

In general, an electromagnetic field, due to electromagnetic radiation generated by a RBS, measured at a point of the geographic area is the superposition of a direct component given by electromagnetic radiation directly reaching the point from the RBS (i.e., there is a line of sight, or optical/geometrical visibility, between the point and the RBS) a reflected component and a diffracted component the latter being generated by electromagnetic radiation generated by the RBS and interacting with an obstacle.

In order to plan an efficient deployment of RBSs of a radio communication network Ray Tracing, or RT, and Intelligent Ray Tracing, or IRT, techniques have been developed.

RT and IRT exploit geometrical optics, or optics, theory for simulating the pattern of electromagnetic radiation emitted by RBSs deployed in various locations of the geographic area in order to identify an operating position for each RBS of the radio communication network.

RT and IRT are generally based on a (digital) cartographic database of the geographic area. Preferably, the cartographic database comprises a three-dimensional vectorial description of the geographic area.

For example, buildings in the geographic area in the cartographic database may be represented as prisms resting on a ground plane with faces (representing building walls) orthogonal to the ground plane. Generally, the roof of the building is simply represented by a base of the prism. Each prism is associated with geographic coordinates of the corresponding building in the geographic area.

In the art, aerial and/or satellite-based photogrammetry are implemented in order to identify building and monitoring changes in the buildings layout in the geographic area. In this case, information on the geographic area obtained by aerial and/or satellite-based photogrammetry is organized in a matrix, or raster, in which each element of the matrix, or pixel, represents a portion (typically a square or rectangular portion) of the geographic area. The size of each pixel is based on a resolution of the data provided by the aerial and/or satellite-based photogrammetry (e.g., for example the pixel have a side with a length ranging from 1 m to 5 m).

The pixels of the raster are analyzed (e.g., each pixel is subjected to a chromatic analysis) in order to identify groups of pixels, having common features, which represent a building in the geographic area.

The shape and geographic position of the pixels of each group are exploited for creating the prism representing the corresponding building in the geographic database.

Unfortunately, RT and IRT applied to the model of the geographic area described by the geographic database provide results affected by anomalies due to the fact that the prism generally may feature surfaces and corners different from the actual shape of the corresponding building.

For example, R. Hoppe, G. Wöfle, and F. M. Landstorfer, "Fast 3D Ray Tracing for the Planning of Microcells by Intelligent Preprocessing of the Database", 3rd European Personal and Mobile Communications Conference (EPMCC) 1999, Paris, March 1999, R. Hoppe, P. Wertz, G. Wöfle, and F. M. Landstorfer, "Fast and Enhanced Ray Optical Propagation Modeling for Radio Network Planning in Urban and Indoor Scenarios", MPRG Wireless Personal Communications Symposium 2000, Blacksburg (Virginia, USA), 14-16 Jun. 2000, and R. Hoppe, "An Introduction to the Urban Intelligent Ray Tracing (IRT) Prediction Model", AWE Communications GmbH, 2005 describe the operation of a radio communication network planning systems based on RT/IRT.

US 2012/062419 discloses an apparatus for analyzing radio wave propagation in a radio wave system. The apparatus includes an identification unit configured to search and identify all objects existing in a service area in which users are provided with services; a construction unit configured to calculate a relative position between the identified objects and acquire a radio wave propagation model based on visibility at respective objects; and an analysis unit configured to apply the radio wave propagation model to ray tracing dynamically and analyze radio wave propagation in the service area.

SUMMARY OF THE INVENTION

The Applicant has observed that, generally, the expedients known in the art are not able to provide for a satisfactory planning of radio communication networks.

Particularly, the applicant has noted that the expedients known in the art provide geographic databases affected by a limited accuracy due to the drawbacks mentioned above.

Moreover, the process for obtaining the model of the geographic area described by the geographic database starting from the aerial and/or satellite-based photogrammetry data requires complex operations involving substantial computing power and/or workforce.

The Applicant has further observed that the network planning according to the known methods and systems is a task requiring long computing times and a large amount of computing resources for being executed.

The Applicant has therefore tackled the problem of how to provide an accurate and precise planning of radio communication networks and at the same time reducing operating costs in terms of computing time and/or resources.

Particularly, an aspect of the present invention proposes a method of planning a deployment of a radio communication network in at least a portion of a geographic area. The radio communication network comprising at least one radio base station capable of providing radio communication services. The method comprises providing a three-dimensional model of the at least a portion of the geographic area; providing a model of the at least one radio base station, said model comprising at least an indication of a position of the radio base station within the geographic area; evaluating a propagation channel within the at least a portion of the geographic area associated with electromagnetic radiation, radiated by the at least one radio base station, at predetermined positions in the three-dimensional model of the geographic area.

In detail, providing a three-dimensional model of the at least a portion of the geographic area comprises subdividing the three-dimensional model of the geographic area so as to obtain a plurality of Primary Elements, each Primary Element comprising at least an indication of a position of the Primary Element within the at least a portion of the geographic area, and identifying triplets of Primary Elements in said plurality, based on geometrical visibility among Primary Elements. Preferably, each triplet of Primary Elements comprises a source Primary Element acting as source of electromagnetic radiation, a destination Primary Element acting as destination of electromagnetic radiation, and an intermediate Primary Element. Even more preferably, the intermediate Primary Element receives the electromagnetic radiation generated by the source Primary Element, and interacts with the received electromagnetic radiation, thereby, as a result of the interaction, electromagnetic radiation propagates from the intermediate Primary Element to the destination Primary Element. The method further comprises planning the deployment of the radio communication network based on the evaluation of the propagation channel.

Preferred features of the present invention are set in the dependent claims.

In one embodiment of the present invention, identifying triplets of Primary Elements comprises identifying as intermediate Primary Element of a triplet a Primary Element having a direct geometrical visibility with the source Primary Element; evaluating geometrical optics interactions between electromagnetic radiation emitted by the source Primary Element and the intermediate Primary Element, and identifying as destination Primary Element of a triplet a Primary Element having a direct geometrical visibility with the intermediate Primary Element and reached by the electromagnetic radiation propagating from the intermediate Primary Element and resulting from the geometrical optics interactions between the intermediate Primary Element and the electromagnetic radiation received from the source Primary Element.

In one embodiment of the present invention, evaluating geometrical optics interactions between electromagnetic radiation emitted by the source Primary Element and the intermediate Primary Element comprises one between evaluating a reflection of electromagnetic radiation emitted by the source Primary Element and reaching the intermediate Primary Element, and evaluating a diffraction of electromagnetic radiation emitted by the source Primary Element and reaching the intermediate Primary Element.

In one embodiment of the present invention, providing a three-dimensional model of the at least a portion of the geographic area comprises determining a first threshold distance accounting for a maximum distance within which reflected electromagnetic radiation allows providing radio communication services; determining a second threshold distance accounting for a maximum distance within which diffracted electromagnetic radiation allows providing radio communication services, and dividing the at least a portion of the geographic area in a plurality of basic parcels, each basic parcel having a size based on at least one among the first threshold distance and the second threshold distance.

In one embodiment of the present invention, dividing the at least a portion of the geographic area in a plurality of basic parcels comprises selecting lengths of a first and second sides of the basic parcels according to:

$$\Delta x > MAX(de, dr), \text{ and}$$

$$\Delta y > MAX(de, dr),$$

wherein $\Delta x$ is a length of the first side of the basic parcel, $\Delta y$ is a length of the second side of the basic parcel, dr is the first threshold distance and de is the second threshold distance.

In one embodiment of the present invention, selecting first and second sides of the basic parcels further comprises checking whether the first and second sides are longer than a third threshold distance, and in the affirmative case, maintaining the selected lengths of first and second sides, or in the negative case, setting the lengths of first and second sides equal to the third threshold distance.

In one embodiment of the present invention, identifying triplets of Primary Elements based on geometrical visibility among Primary Elements further comprises determining a reduced preprocessing area comprising a first basic parcel comprising the source Primary Element of a triplet and second basic parcels adjacent to the first basic parcel.

Preferably, identifying triplets of Primary Elements based on geometrical visibility among Primary Elements comprises identifying triplets of Primary Elements comprised within the reduced preprocessing area.

In one embodiment of the present invention, subdividing the three-dimensional model of the geographic area to obtain a plurality of Primary Elements comprises providing Primary Elements having a one among a quadrangular shape, a segment shape or a point shape, for each Primary Element, providing coordinates of a center of each Primary Element, and further providing coordinates of vertices of the quadrangular shape if the Primary Elements has a quadrangular shape, or coordinates of opposite ends of the segment shape if the Primary Element has a segment shape.

In one embodiment of the present invention, subdividing the three-dimensional model of the geographic area to obtain a plurality of Primary Elements further comprises for each Primary Element, providing a relative dielectric constant and a conductivity of the Primary Element.

In one embodiment of the present invention, providing a three-dimensional model of the at least a portion of the geographic area further comprises providing a raster database built through an automatic interpretation process applied to imaging data of the geographic area, the raster database comprising information about artefacts within the at least one portion of the geographic area.

In one embodiment of the present invention, the raster database comprises a plurality of artefact elements and non-artefacts elements. Preferably, providing a three-dimensional model of the at least a portion of the geographic area further comprises identifying a cluster of artefact elements as an artefact comprised in the at least one portion of the geographic area, the artefact interacting with electromagnetic radiation.

In one embodiment of the present invention, providing a raster database comprises filtering the raster database for separating the clusters of artefact elements one from the other by one or more non-artefact elements.

In one embodiment of the present invention, filtering the raster database comprises filtering the raster database by exploiting a street layout data accounting for streets within the geographic area, said exploiting comprising superimposing the street layout data to the raster database and redefining as a non-artefact element each artefact element superimposed to the street layout data.

In one embodiment of the present invention, filtering the raster database comprises identifying as a spike of a cluster of artefact elements one or more artefact elements surrounded by a number of non-artefact elements trespassing a threshold size value, and filtering the spike by re-classifying the one or more artefact elements of the identified spike as non-artefact elements.

In one embodiment of the present invention, filtering the raster database comprises identifying as one or more artefact elements coupling a pair of clusters of artefact elements one or more artefact elements having a pattern matching one among a plurality of predetermined mask, and filtering the one or more artefact elements by re-classifying the latter as non-artefact elements.

In one embodiment of the present invention, filtering the raster database comprises identifying as a spurious cluster of artefact elements each cluster of artefact elements comprising a number of artefact elements lower than a minimum number, and filtering the spurious cluster by re-classifying the artefact elements of the identified spurious cluster as non-artefact elements.

In one embodiment of the present invention, providing a three-dimensional model of the at least a portion of the geographic area further comprises for each cluster of artefact elements, defining a polygon corresponding to a perimeter defined by the cluster of artefact elements.

In one embodiment of the present invention, providing a three-dimensional model of the at least a portion of the geographic area further comprises for each cluster of artefact elements, identifying a candidate polygon fitting the polygon, the candidate polygon being defined according to one among a combinatory criterion, the combinatory criterion providing a quadrangular candidate polygon sharing vertices with the polygon; a pattern recognition criterion, the pattern recognition criterion selecting a candidate polygon from a plurality of preformed polygonal shapes, and a directional criterion, the directional criterion providing a candidate polygon generated in such a way that each vertex of the candidate polygon corresponds to a vertex of the polygon at which a substantial change in an average orientation of the sides of the polygon is detected.

In one embodiment of the present invention, combinatory criterion comprises defining a maximum number of considered vertices of the polygon to be considered as vertices of quadrangular candidate polygon.

In one embodiment of the present invention, the pattern recognition criterion comprises rotating and scaling polygon preformed polygonal shapes with respect to the polygon.

In one embodiment of the present invention, identifying a candidate polygon fitting the polygon further comprises, for each polygon defining a plurality of candidate polygons, evaluate a quality of each candidate polygon of the plurality of candidate polygons as $$Q = \frac{X \cap Y}{X \cup Y},$$

where Q is the quality of the candidate polygon, Y is a surface area of the candidate polygon and X is a surface area of the polygon, and identifying as the candidate polygon fitting the polygon the candidate polygon associated with the highest quality.

In one embodiment of the present invention, defining a plurality of candidate polygons, for each polygon comprises defining the plurality of candidate polygons according to at least two criteria among the combinatory criterion, the pattern recognition criterion and the directional criterion. Preferably, identifying as the candidate polygon fitting the polygon the polygon associated with the highest quality comprises identifying a criterion-specific candidate polygon associated with the highest quality among the candidate polygons defined according to each one of the at least two criteria, identifying as the candidate polygon fitting the polygon the criterion-specific candidate polygon associated with the highest quality.

In one embodiment of the present invention, providing a model of the at least one radio base station comprises defining a radio Primary Element according to the indication of a position of the radio base station within the geographic area. Preferably, evaluating a propagation channel comprises identifying Primary Elements having a direct geometric visibility with the radio Primary Element, and for each Primary Element having a direct geometric visibility with the radio Primary Element, identifying triplets of Primary Elements based on geometrical visibility among Primary Elements, each triplet comprising the radio Primary Element acting as source of electromagnetic radiation, the destination Primary Element, and the Primary Element having a direct geometric visibility with the radio Primary Element as the intermediate Primary Element.

In one embodiment of the present invention, evaluating a propagation channel further comprises iteratively searching the triplets of Primary Elements identified based on geometrical visibility among Primary Elements for identifying further triplets of Primary Elements. Preferably, each further triplet of Primary Elements comprises a further source Primary Element corresponding to a previous intermediate Primary Element, being the intermediate Primary Element of a previously identified triplet of Primary Elements identified in a previous iteration; a further intermediate Primary Element corresponding to a previous destination Primary Element, being the destination Primary Element of the previously identified triplet of Primary Elements, and a further destination Primary Element.

In one embodiment of the present invention, providing a model of the at least one radio base station comprises providing at least an indication of electromagnetic radiation features of the at least one radio base station. Preferably, defining a plurality of Primary Elements further comprises, for each Primary Element, providing an indication of a type of Primary Element. Further preferably, valuating a propagation channel further comprises evaluating the propagation channel at destination Primary Elements belonging to one or more predetermined types.

In one embodiment of the present invention, subdividing the three-dimensional model of the geographic area to obtain a plurality of Primary Elements further comprises for each Primary Element, providing an indication of the type of the Primary Element, comprised among a face-type Primary Element identifying a portion of a surface of an artefact, an edge-type Primary Element identifying a portion of an edge of an artefact, a ground-type Primary Element identifying a portion of a ground of the at least one portion of the geographic area. Preferably, evaluating the propagation channel at destination Primary Elements belonging to one or more predetermined type comprises evaluating the propagation channel at face-type destination Primary Elements.

In one embodiment of the present invention, the indication of the type of the Primary Element further comprises virtual-type Primary Element identifying a point in space at a predetermined distance from a respective ground-type Primary Element, the virtual-type Primary Element acting only as destination Primary Element. Preferably, evaluating the propagation channel at destination Primary Elements belonging to one or more predetermined types comprises evaluating the propagation channel at virtual-type destination Primary Elements.

Another aspect of the present invention proposes a system for planning deployment of a radio communication network in at least a portion of a geographic area, the radio communication network comprising at least one radio base station capable of providing radio communication services, the system comprising hardware, firmware, a combination of hardware and software, or software configured for implementing the method of above.

In one embodiment of the present invention, the system comprises a processor configured for implementing the method according to any one of the preceding claims, and a repository configured for storing data, the repository being operatively coupled with the processor.

Preferably, for each triplet of Primary Elements, the repository stores at least one data file comprising an indication of the source Primary Element acting as source of electromagnetic radiation and of the destination Primary Element acting as destination of electromagnetic radiation of the triplet of Primary Elements, and at least one indexing file comprising an indication of the intermediate Primary Element of the triplet of Primary Elements receiving the electromagnetic radiation generated by the source Primary Element and propagating electromagnetic radiation to the destination Primary Element, and a position within the least one data file of the indication of the source Primary Element and of the destination Primary Element of the triplet of Primary Elements.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1:
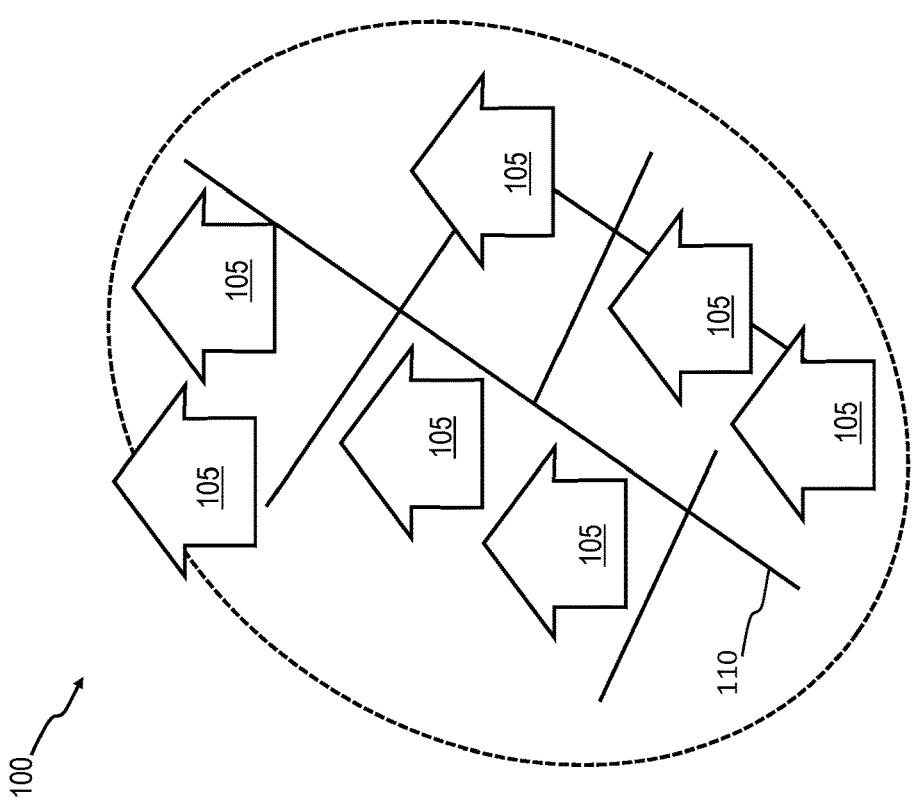
FIG. 1 is a schematic representation of a geographic area in which the deployment of a radio communication network is to be planned.

With reference to the drawings, FIG. 1 is a schematic representation of a geographic area 100 in which the deployment of a radio communication network is to be planned.

In the geographic area 100, artefacts such as for example buildings 105 and/or infrastructures, e.g. streets 110, may be provided, particularly in urban environments (e.g., cities, towns, etc.). As known, buildings 105 and possibly other artefacts (e.g., cumbersome street furniture, monuments, etc.) affect the propagation of electromagnetic radiation. Therefore, the effect of buildings 105 and possibly of other artefacts on the electromagnetic radiation emitted by Radio Base Stations, or RBS (e.g., evolved node B, or eNB, in the Long Term Evolution, LTE, and Long Term Evolution-Advance. LTE-A radio communication technologies), i.e. elements of the radio communication network that provide a radio communication services to mobile user equipment (mobile phones, smartphones, tablets, etc.), has to be considered during the radio communication network planning.

According to embodiments of the present invention, initially, a (graphic) three-dimensional model of the geographic area 100 is provided. Preferably, a (three-dimensional) geographic database is provided, modelling the geographic area 100. Preferably, buildings (and artefacts) are described in a vectorial manner through a respective matrix, or raster, generated based on aerial and/or satellite photogrammetry (as described in the following).

As described in the following, the geographic database is divided in a plurality of Primary Elements PE for each of which geometrical optics features (i.e., based on geometrical optics, or rays optics) are analyzed in order to describe interactions, at least under a geometric point of view, between Primary Elements PE and electromagnetic radiation.

Primary Elements PE are relevant portions, preferably points quadrangular-shaped of segment-shaped portions, or tiles of the three-dimensional model; e.g., each surface and edge of buildings/artefacts. In other words, the Primary Elements PE represents unitary elements of the model with which the electromagnetic radiation may interact (it should be noted that a number of Primary Elements PE of the geographic database corresponds to a resolution of the model of the geographic area 100).

In the present disclosure, geometrical optics, or ray optics, is used for describing propagation of electromagnetic radiation in terms of rays. Preferably, simplifying assumptions of geometrical optics comprise that rays propagate in rectilinear paths (since travelling in a homogeneous medium, i.e. air) and may be absorbed, reflected or diffracted.

Accordingly, one or more databases describing the geometrical optics interactions of rays with Primary Elements PE are generated and used for searching an optimal positioning of RBS of the radio communication network in the geographic area 100.

Preferably, a portion of the one or more databases comprise information regarding geometrical visibility relationships between couples of Primary Elements PE and further portion of the one or more databases comprise information regarding an 'enhanced' geometrical visibility relationships among triplets of Primary Elements PE of the geographic area 100 (as described in the following).

Particularly, geometrical visibility is a mathematical abstraction of the real-life notion of visibility. Generally, two Primary Elements PE of the geographic area 100 (or of a model of the geographic area 100) are geometrically visible to each other, if a line segment that joins the Primary Elements PE does not intersect any obstacles (e.g., any other Primary Elements PE).

According to an embodiment of the invention, the enhanced geometrical visibility comprise geometrical visibility between three Primary Elements PE one of which interposed between the other two Primary Elements PE. In other words, the interposed, or through, Primary Element PE is directly geometrically visible to both the other two Primary Elements PE, accordingly, the latter are visible to each other 'through' the interposed Primary Element PE (as described in the following).

Advantageously, the one or more databases provide a three-dimensional model of the geographic area under a geometrical optics point of view and thus can be effectively exploited for evaluating propagation channels within the geographic area 100 for one or more RBS to be deployed, in order to identify an advantageous, or optimal, deployment location of each one of the RBS to be deployed.

It should be noted that the wording 'evaluating propagation channels' is herein used for indicating an evaluation of at least a power of electromagnetic radiation in a predetermined point of the geographic area 100, i.e. a Primary Element PE of the geographic area 100. Advantageously, the evaluation of propagation channels may comprise the evaluation of further parameters related to electromagnetic radiation propagation, such as for example an evaluation of spectrum and spread delays of components of electromagnetic radiation.

For example, the evaluation of the propagation channels may be based (in a non-limiting manner) on the teachings comprised "Propagation data for the terrestrial land mobile service in the VHF and UHF bands", Recommendation ITU-R P.1145, 1995.

Thus, it is possible to plan the deployment of RBS in order to provide an efficient provisioning of radio communication services in the geographic area 100. In other words, an improved planning of a radio communication network is achieved.

In an embodiment of the invention, the one or more databases describing the geometrical optics features of Primary Elements PE are provided in the following manner.

Initially, information on the geographic area obtained through imaging data, such as for example aerial and/or satellite-based photogrammetry, is organized in a matrix, or raster, in which each element of the matrix, or pixel, represents a portion (typically a square or rectangular portion) of the geographic area 100. The size of each pixel is based on a resolution of the data provided by the aerial and/or satellite-based photogrammetry (e.g., for example the pixel have a side with a length ranging from 1 m to 5 m).

Figure 2:
FIG. 2 is a schematic graphic representation of (at least one portion of) a raster database used for identifying buildings in the geographic area.

For example, FIG. 2 is a schematic graphic representation of (at least one portion of) a raster database 200 used for identifying buildings 105 (end/or other artefacts) in the geographic area 100. The raster database 200 is preferably built through an automatic interpretation process applied to images of the geographic area 100 obtained by means of by imaging data such as aerial and/or satellite-based photogrammetry. Particularly, the raster database 200 comprises a plurality of unitary elements, such as pixels.

Generally, the pixels may belong to two main types, i.e. 'building' pixels or 'non-building' pixels (or, more generally, artefact pixels and non-artefact pixels, respectively). Building pixels are clustered in groups 205 of one or more building pixels. Each group 205 of building pixels of the raster database 300 defines a layout (in plan view) of a respective building 105 of the geographic area 100. Non-building pixels generally comprise the pixels that surrounds the groups 205 of building pixels and may corresponds to various elements of the geographic area 100 (such as streets, fields, etc.).

An automatic interpretation process of the aerial and/or satellite-based photogrammetry of the geographic area 100 is prone to generation of anomalies in the information comprised in the raster databases 300.

Figure 3B:
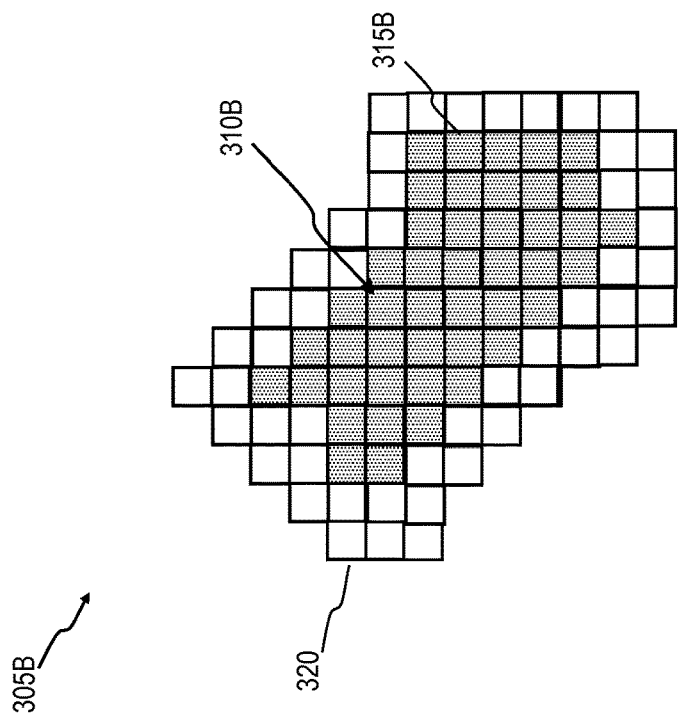
FIGS. 3A and 3B are schematic representations portions of a raster according to an embodiment of the present invention.
Figure 3A:
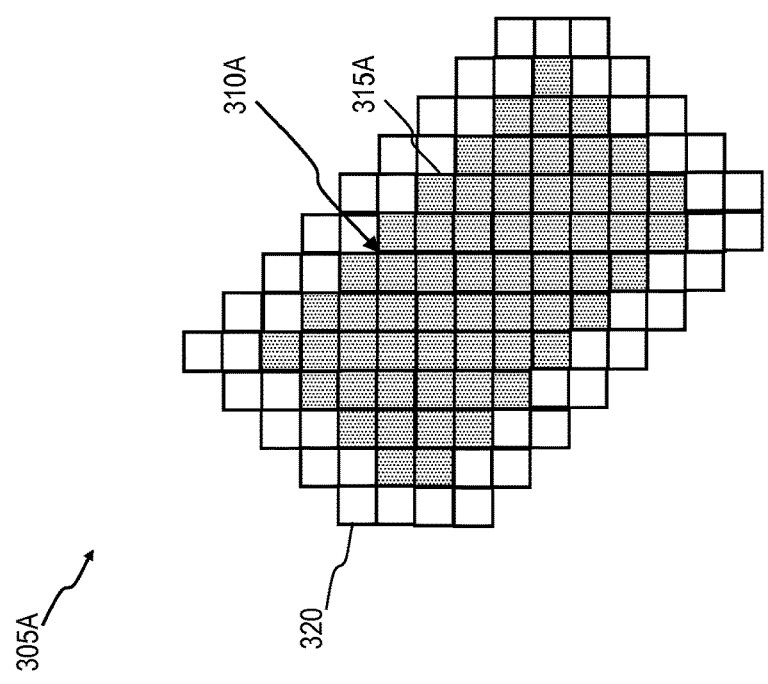

FIGS. 3A and 3B are schematic and graphic representation portions 305A and 305B of a raster according to an embodiment of the present invention, each portion comprising a respective building 310A and 310B, each of which is represented by a plurality of building pixels 315A or 315B, respectively.

It should be noted that a vectorial representation of the buildings 310A and 310B could not be univocally defined only by means of the information comprised in the raster database 200, even in case a human intervention is exploited.

For example, even though a substantially rectangular shape may be identified for the building 310A by analyzing pixels of the raster—e.g., difference in color or luminosity of the pixels in the raster portion 305A are used for identifying the plurality of building pixels 315A composing the building 310A and non-building pixels 320A surrounding the building 310A—as shown in FIG. 3A, features such as for example an exact size and orientation of the building 310A are not univocally identified.

The same considerations hold for the building 310B in the raster portion 305B of FIG. 3B, for which also the general shape of the building 310B is not univocally determined due to the irregular disposition of the building pixels 315B composing the building 310B.

Therefore, data yielded by the automatic interpretation process of the aerial and/or satellite-based photogrammetry of the geographic area 100 are advantageously (automatically) filtered in order to attain a more precise and accurate raster database 200, which, accordingly, allows obtaining a more precise and accurate vectorial model of the geographic area 100 as described in the following.

Figure 4:
FIG. 4 is a schematic and graphic representation of the raster database over which street layout data are superimposed.

In one embodiment of the invention, a street layout data 405 in the geographic area 100 may be exploited for filtering the result of the automatic interpretation process as shown in FIG. 4 that is a schematic and graphic representation of the raster database 200 over which street layout data 405 are superimposed.

Generally, the street layout data 405 comprise an indication of the position of the centerline of each street in the geographic area 100 and, preferably, an indication of a wideness (e.g., in meters or centimeters) of each street comprised within the geographic area 100.

In an embodiment of the invention, the street layout data 405 is available, or computable, in a vectorial format. For example, the street layout data 405 undergoes a so-called 'buffering' operation available, for example, through Geographical Information Systems, or GIS (i.e., systems designed to capture, store, manipulate, analyze, manage, and present all types of spatial and/or geographical data). Such buffering operation provides the street layout data 405 in a format that may be superimposed to the raster database 300.

The street layout data 405 allows defining with better precision and accuracy a perimeter of the groups 205 of building pixels in the raster database 200 (representing buildings 105 of the geographic area).

For example, pixels initially classified as building pixels but superimposed to street pixels of the street layout data 405 are identified as anomalies, and are re-classified as non-building pixels. In this way, it is possible to refine a layout of the groups 205 of building pixels, i.e. the layout of the buildings such as the buildings 310A and 310B.

In addition, the filtering of the raster database 200 may comprise a spikes suppression operation. Particularly, spikes are anomalies in the buildings, such as the buildings 310A and 110B, of the raster database 200 that comprise one or more pixels concentrated at the edge of what can be identified substantially as a straight side of the buildings 310A and 110B. In the example of FIG. 4, three spikes 410 are shown protruding from sides of groups 205 of the raster database 200.

The filtering of spikes 410 implies identifying the pixels of each spike 410 and re-classifying such pixels as non-building pixels.

In one embodiment of the present invention, spikes 410 may be identified based on a number of non-building pixels surrounding the building pixels allegedly belonging to a spike 410. For example, building pixels are considered belonging to a spike 410 in case a number of non-building pixels comprised in a predetermined range from the considered pixel are equal to or trespassing a threshold value. Preferably, the range is measured in pixel, e.g. the range may be set to one pixel, thus requiring the analysis of eight pixels adjacent to the considered pixel and the threshold value may be set to five or six non-building pixels surrounding the alleged pixel belonging to a spike 410).

In other words, a building pixel is deemed belonging to a spike 410 whether it is surrounded by a number equal to, or greater than, a threshold value of non-building pixels.

Advantageously, the filtering of spikes 410 is verified before re-classifying a building pixel as a non-building pixel in order to avoid an excessive filtering of the raster database 410.

Figure 5:
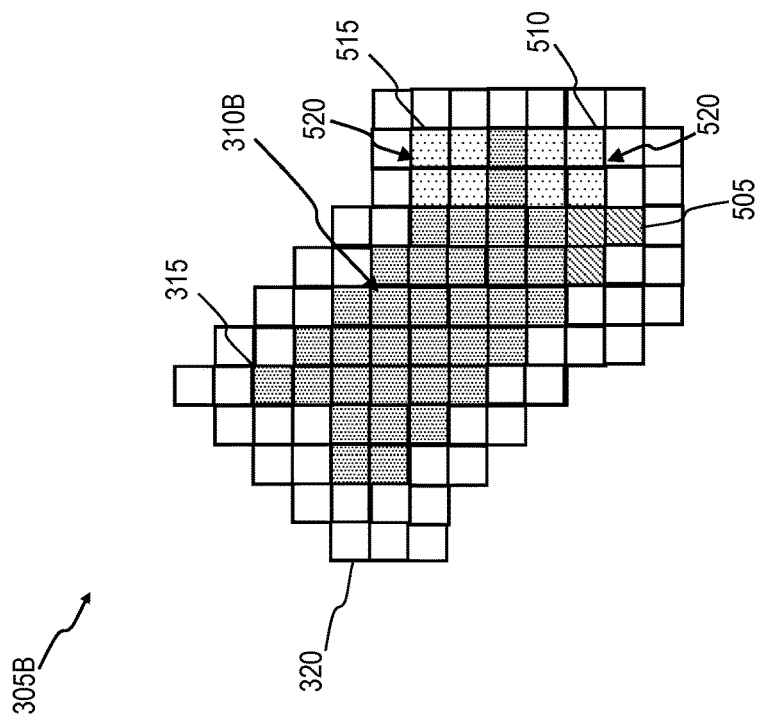
FIG. 5 is a schematic and graphic representation of a spike filtering applied to a building in which three pixels potentially belonging to spikes are identified.

For example, FIG. 5 is a schematic and graphic representation of a spike filtering applied to the building 310B in which three pixels 505, 510 and 515 potentially belonging to spikes are identified.

Each one of the three pixels 505, 510 and 515 has a number of surrounding non-building pixels that exceed a threshold value (e.g., equal to five non-building pixels).

Instead of promptly re-classifying all the three pixels 505, 510 and 515 as non-building pixels it is verified whether or not the three pixels 505, 510 and 515 effectively belongs to a spike 510.

Preferably, each one of the three pixels 505, 510 and 515 (potentially belonging to a spike 410) is analyzed in order to determine whether the pixel 505, 510 or 515 belongs to a corner of the building 310B instead of belonging to a spike 410.

To this extent, for each pixel 505, 510 or 515, for which a number of surrounding non-building pixels exceeds the threshold value it is further verified whether the pixel is a building pixel 315B positioned at a vertex of the group of building pixels 315B that defines the building 310B in the raster database 200.

For example, it is checked whether the pixel is a building pixel 315B positioned at a vertex of a portion of building pixels 315B of the building 310B. Preferably, the portion of building pixels 315B considered has a squared shape that is defined by a side comprising a predetermined number of building pixels 315B (such as for example, two pixels). Even more preferably, the predetermined number of building pixels 315B is based on a ratio between the size of the pixels of the raster database 200 and an average size of the building 310B.

In the example of FIG. 5, on inspection, pixels 510 and 515 result to be corners of the building 310B since they are positioned at the vertex of respective 2×2 squares 520 of building pixels 315B. Conversely, the pixel 505 belongs to a spike 410 not being positioned at the vertex of a 2×2 square of building pixels 115B.

The filtering of the raster database 200 may further comprise an isthmuses filtering operation.

Figure 6:
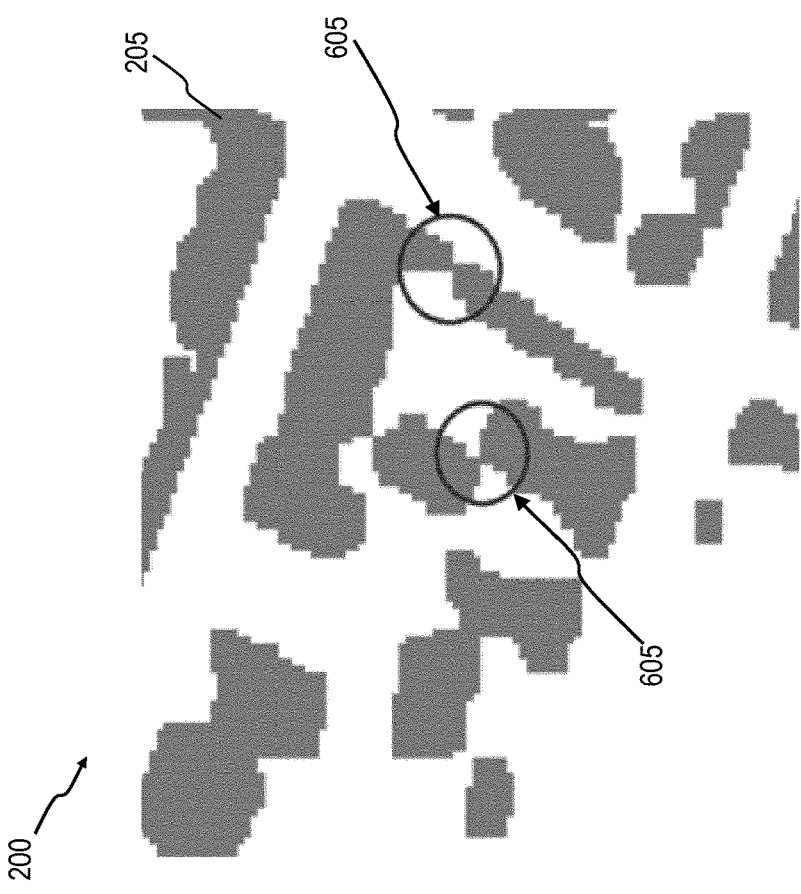
FIG. 6 is a schematic and graphic representation of a portion of the raster database highlighting isthmus pixels.

The isthmuses filtering operation is meant to identify and remove anomalies that unduly couple together groups 205 of building pixels. In other words, the isthmuses filtering operation identifies and removes pixels, called isthmus pixels in the following, erroneously classified as building pixels that connect two (or more) groups 205 of buildings pixels as schematically shown in FIG. 6, which is a schematic and graphic representation of a portion 600 of the raster database 200 highlighting isthmuses 605.

Figure 7:
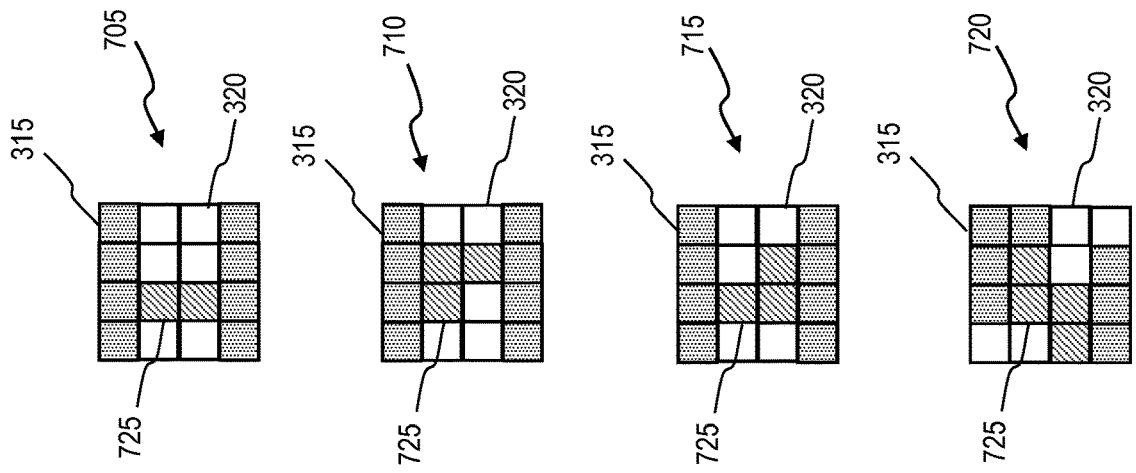
FIG. 7 is a schematic representation of exemplary four isthmus masks.

In one embodiment of the present invention, the isthmuses filtering operation comprises exploiting one or more isthmus masks. FIG. 7 is a schematic and graphic representation of four exemplary isthmus masks 705, 710, 715 and 720. Each isthmus masks 705, 710, 715 and 720 comprises a respective pattern of one or more isthmus pixels 725 that usually couple two (or more) buildings together. The isthmus masks 705, 710, 715 and 720 are superimposed to the raster database 200 and pixels of the raster database 200 that match one of the isthmus masks 705, 710, 715 and 720 are identified as comprising isthmus pixels 725 and, accordingly, such isthmus pixels 7255 are re-classified as non-building pixels.

Figure 8:
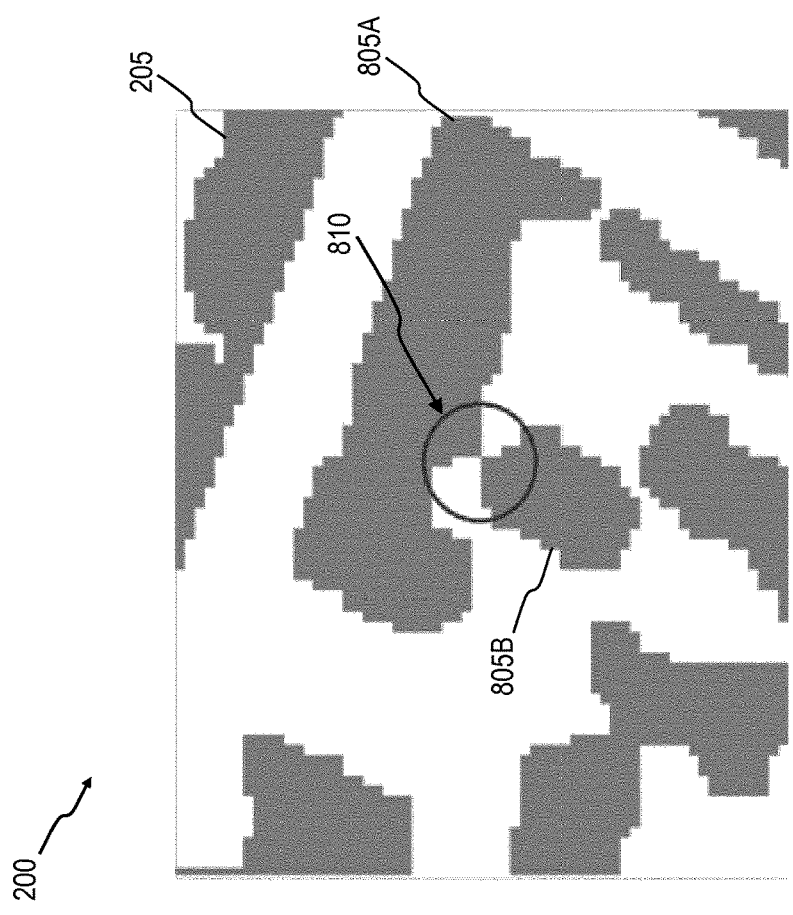
FIG. 8 is a schematic and graphic representation of a portion of the raster databases comprising two adjacent groups of building pixels contacting each other.

FIG. 8 is a schematic and graphic representation of a portion of the raster databases 200 comprising two adjacent groups 805A and 805B of building pixels contacting (see circle 810 in FIG. 8) each other. The contact between two adjacent groups 805A and 805B of building pixels may be filtered in order to avoid errors in determining shape and number of the building in the raster database 200.

Figure 9:
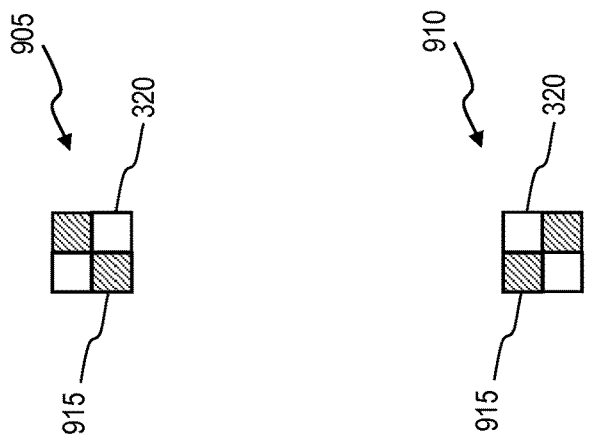
FIG. 9 is a schematic representation of exemplary two adjacency masks.

In order to identify contacts pixels between adjacent groups 805A and 805B of building pixels one or more adjacent masks are preferably exploited, such as the two adjacency masks 905 and 910 schematically and graphically represented in FIG. 9.

The adjacency masks 905 and 910 are superimposed to the raster database 200 and matches to the pixel patterns corresponding to adjacency masks 905 and 910 are searched in the raster database 200. Each contact pixel 810 identified is then removed by re-classifying such contact pixel 915 as a non-building pixels 320 of the raster database 200, thus separating adjacent groups 805A and 805B of building pixels.

Figure 10:
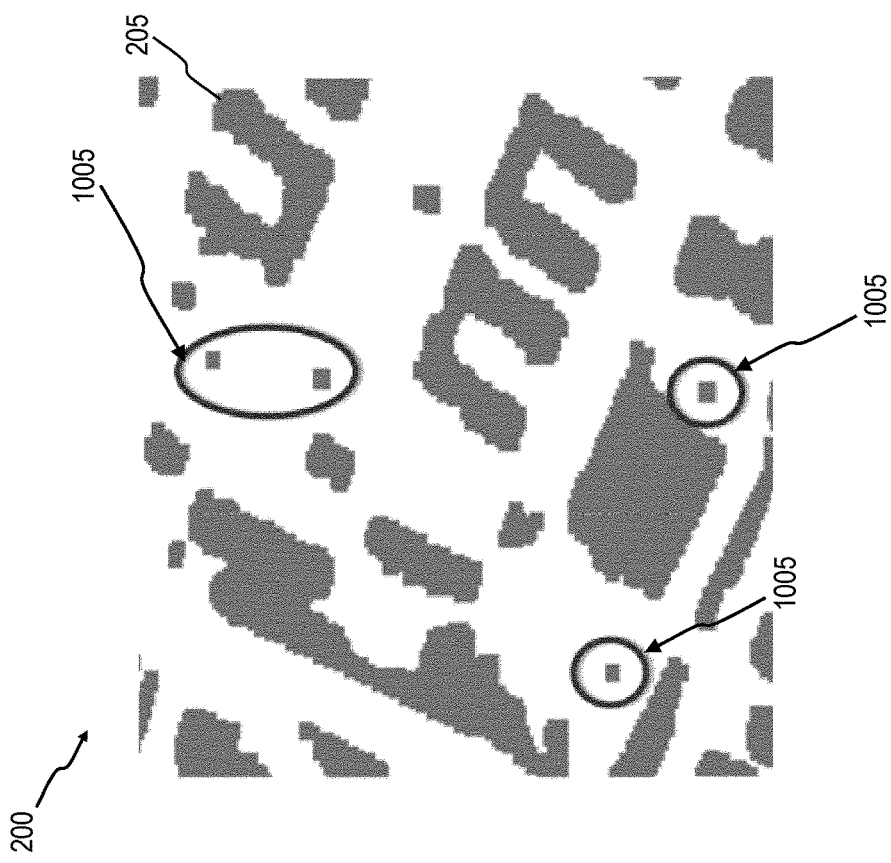
FIG. 10 is schematic and graphic representation of a portion of the raster databases comprising a plurality of spurious building pixel.

Moreover, the raster database 200 may comprise small groups of building pixels that are due to noise and/or other spurious errors during conversion from images of the aerial and/or satellite photogrammetry in the raster database 200, as shown in FIG. 10, which is a schematic and graphic representation of a portion of the raster databases 200 comprising a plurality of spurious building pixels 1005.

Such small groups of building pixels 1005 may be identified and removed by means of a spurious filtering operation.

For example, groups of building pixels comprising a number of building pixel lower than a minimum number of building pixels are considered being a group of spurious building pixels 1005 and, therefore, the spurious building 1005 pixels of the group are converted in non-building pixels.

After the filtering phases just described, the raster database 200 comprises one or more groups 205 of buildings pixels isolated one from the other by non-building pixels.

In this way, a model of each building in the geographic area 100 is obtained based on the (filtered) raster database 200

In an embodiment of the invention, for each group 205 of building pixels in the raster database 200 a starting vectorial shape, or trivial polygon, is identified.

The trivial polygon substantially corresponds to the simplest polygon that may superimposed to the considered group 205 of building pixels and corresponds to an initial guess of a layout (in plan view) of the corresponding building 105 of the geographic area 100.

In an embodiment of the invention, the trivial polygon is determined as the polygon corresponding to the external sides of all the building pixels of the group 205 of building pixels that define the border of the group 205 of building pixels. In other words, a shape trivial polygon is defined by the side(s) of all building pixels of the group 205 that are adjacent to a non-building pixel in the raster database 200.

In case one or more external sides of different building pixels are aligned one with the other, such external sides are considered as a single side of the trivial polygon.

Accordingly, the sides of the trivial polygon are aligned along on between two orthogonal directions (i.e., abscissa and ordinate coordinates) corresponding to directions of the sides of the pixels in the raster database 200.

In summary, a generic trivial polygon substantially corresponds to a perimeter of the respective group 205 of building pixels in the raster database 200.

It should be noted that directly using the trivial polygon in ray tracing application since its simplicity would yield a low precision and accuracy in the modelling of the corresponding building 105 of the geographic area 100.

According to an embodiment of the invention, in order to determine a precise and accurate model of buildings 105 in the geographic database based on a corresponding group 205 of building pixels in the raster database 200 a set of simplified vectorial shapes, or candidate polygons, are exploited. In other words, a fitting operation is performed in order to find a candidate polygon that best fits the trivial polygon (allowing a more accurate and reliable model of the building represented by the group 205 of building pixels).

The candidate polygons are polygons that represent in a more reliable manner the shape of the building 105 and are optimized for the use in radio communication planning based on ray tracing with respect to the trivial polygon.

Particularly, candidate polygons are processed and compared with the trivial polygon for representing the layout of the buildings 105 in the vectorial model of the geographic area 100.

In one embodiment of the invention, for each candidate polygon a quality indicator Q is computed based on a union and an intersection of a surface area Y of the candidate polygon with a surface area X of the trivial polygon, such as for example:

$$Q = \frac{X \cap Y}{X \cup Y}, \quad (1)$$

It should be noted that the value of the quality indicator Q ranges from 1 (i.e., complete match) to 0 (i.e., no match).

The candidate polygon attaining the greatest quality indicator Q is chosen as vectorial representation of the considered building.

In an embodiment of the invention, the candidate polygons may be determined according to one or more selected criteria.

For example, three different criteria may be exploited either separately or in combination for defining the candidate polygons: a combinatory criterion, a pattern recognition criterion and a directional criterion.

Combinatory Criterion

The combinatory criterion provides a multiplicity of candidate polygons shaped as quadrangles that comprise internal angles greater than an angle threshold value $\alpha_{min}$.

Figure 11:
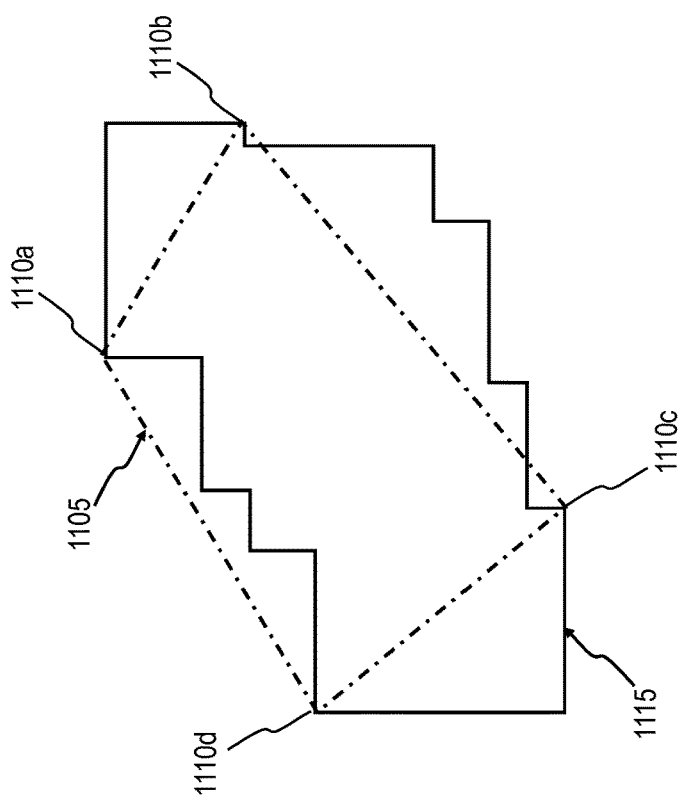
FIG. 11 is a schematic candidate for a considered trivial polygon according to a combinatory criterion.

A generic candidate polygon 1105 comprise a quadrangle that share four vertices 1110a, 1110b, 1110c and 1110d with a corresponding trivial polygon 1115, as shown in FIG. 11.

Accordingly, the total number $N_{quad}$ of candidate polygons obtained by the combinatory criterion may be computed as:

$$N_{quad} = \binom{N}{4} = \frac{N \cdot (N-1) \cdot (N-2) \cdot (N-3)}{4 \cdot 3 \cdot 2}, \quad (2)$$

where N is the number of vertices of the trivial polygon.

In one embodiment of the invention, a maximum number $N_{max}$ of considered vertices of the trivial polygon is defined in order to limit a computing power and computing time dedicated to the implementation of the combinatory criterion even in case of trivial polygons comprising a great number of vertices. In other words, the maximum number $N_{max}$ defines a maximum computing power and computing time dedicated to the implementation of the combinatory criterion.

Pattern Recognition Criterion

The pattern recognition criterion provides a multiplicity of candidate polygons based on preformed polygonal shapes.

Figure 12:
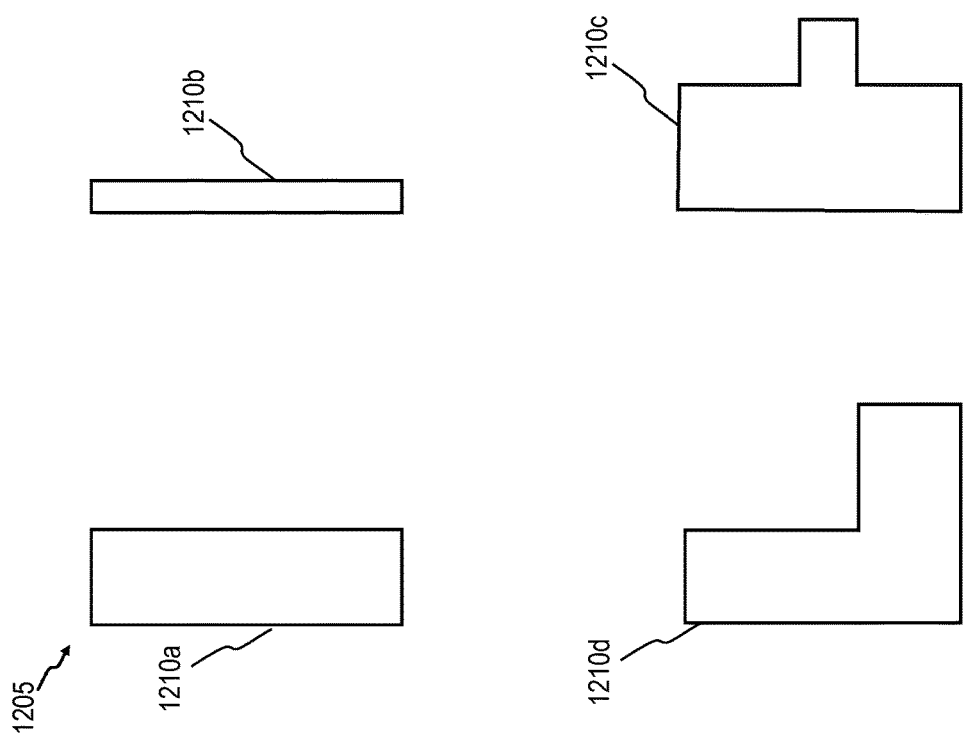
FIG. 12 is schematic and graphic representation of a library comprising four preformed polygonal shapes according to a pattern recognition criterion.

Preferably, candidate polygons are identified by means of a comparison between preformed polygonal shapes and the trivial polygon of the considered building. For example, a library comprising one or more preformed polygonal shapes is provided, as shown in FIG. 12 that is a schematic and graphic representation of a library 1205 comprising four preformed polygonal shapes 1210a-d.

Even more preferably, each preformed polygonal shape 1210a-d, may be compared a plurality of times with the trivial polygon. Particularly, at each comparison the preformed polygonal shape is rotated and scaled up and/or down of predetermined values.

The possibility of rotating and scaling the preformed polygonal shapes ensures that even a library 1205 comprising a limited number of preformed polygonal shapes 1210a-d may be processed for providing a sufficient collection of samples among which it is possible to find a satisfactory match for the trivial polygon.

In an embodiment of the invention, the pattern recognition criterion initially comprises superimposing a generic preformed polygonal shape in the library to the trivial polygon by aligning the barycenter of the preformed polygonal shape with the barycenter of the trivial polygon. The preformed polygonal shape is then rotated and scaled in order to obtain different comparisons between the preformed polygonal shape so manipulated and the trivial polygon.

For example, the preformed polygonal shape is initially scaled to correspond to a (minimum) bounding box, aligned with the axis of the pixels, for the trivial polygon. Particularly, the bounding (or enclosing) box for a point set, i.e. the trivial polygon, is a box (e.g., a quadrangle in two dimension) with the smallest measure (area, volume, etc.) within which all the points of the set lie. Afterwards, the preformed polygonal shape may be rotated in order to align a smallest side thereof. Similarly, an initial rotation of the preformed polygonal shape may be performed in order to have a smallest side of the preformed polygonal shape corresponding to a smallest side of the bounding box of the trivial polygon.

In this way, it is obtained a 'zero order' preformed polygonal shape which is compared with the trivial polygon and the associated quality indicator Q is computed.

Figure 13A:
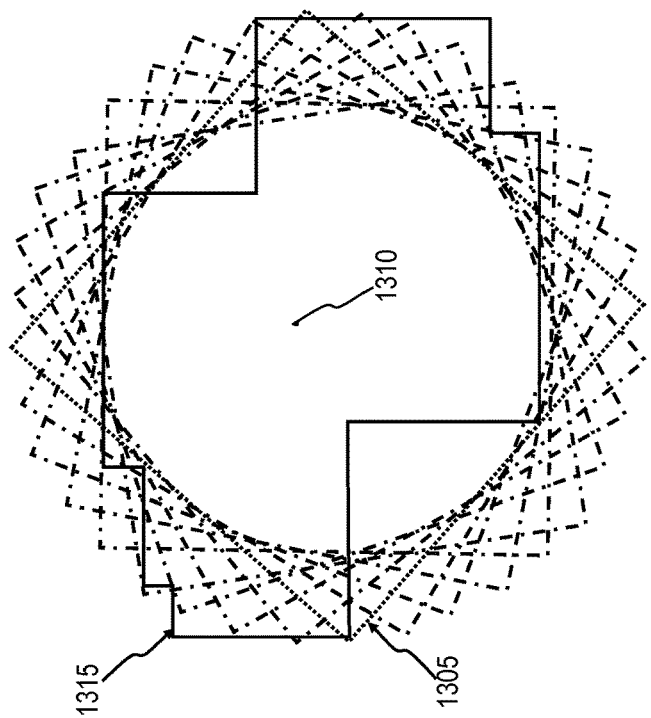
FIG. 13A is a schematic and graphic representation of a zero-order preformed polygonal shape progressively rotated about its barycenter according to the pattern recognition criterion.

As shown in FIG. 13A, a zero order preformed polygonal shape 1305 is progressively rotated—e.g., with discrete increments, or rotation steps, of a rotation angle, such as for example 1°, 3°, 9°, etc. —about its barycenter 1310. At each rotation step the quality indicator Q is computed for the rotated zero order preformed polygonal shape 1305 with respect to the trivial polygon 1315 analyzed.

Figure 13B:
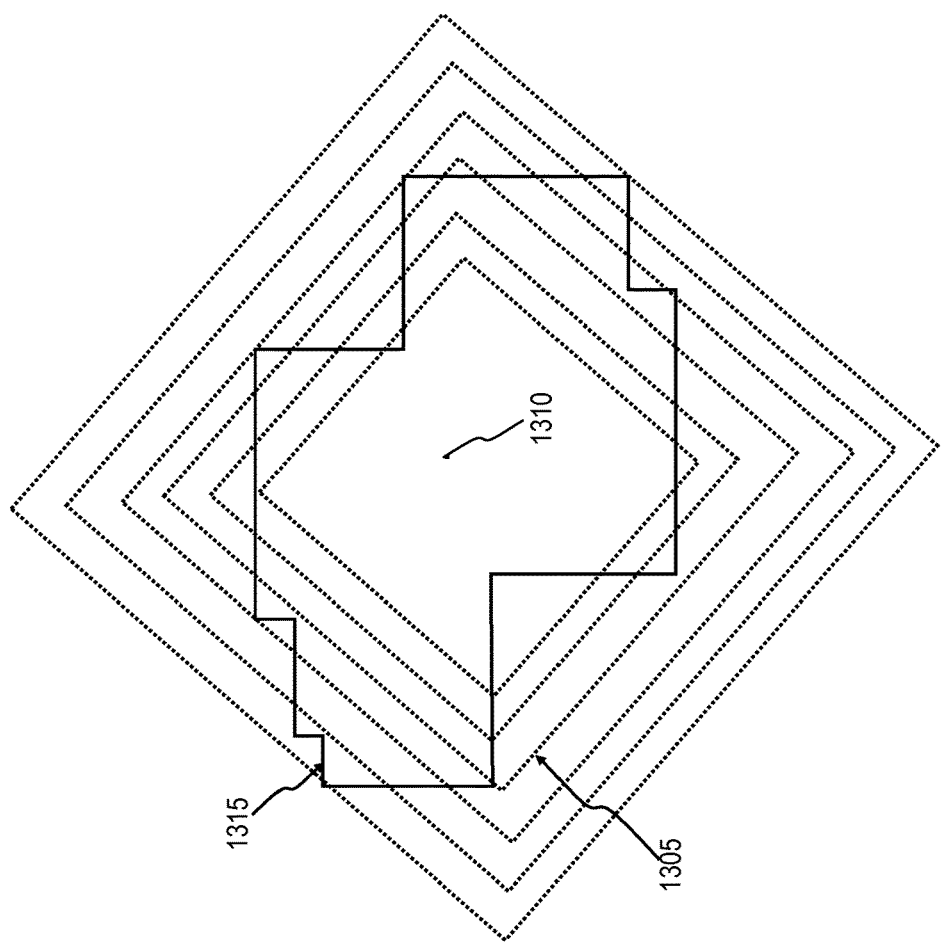
FIG. 13B is a schematic and graphic representation of a rotated zero order preformed polygonal shape progressively scaled according to the pattern recognition criterion.

Afterwards the rotation of the zero order preformed polygonal shape 1305 having the highest quality indicator Q is determined, the zero order preformed polygonal shape is progressively scaled, as shown in FIG. 13B, —e.g., by a predetermined scaling step, such as for example ±5%, ±10%, ±20%, etc. of an initial size of the zero order preformed polygonal shape 1305. Again, a quality indicator Q is computed for each scaled (previously rotated) zero order preformed polygonal shape 1305.

The scaling and rotation operation is then iterated for a predetermined number of scaling steps obtaining a respective quality indicator Q for each scaled and rotated version of the zero order preformed polygonal shape 1305 considered.

It should be noted that the scaling operation and the rotating operation may be inverted without requiring modification to the procedure.

In one embodiment of the invention, one or more stop conditions for the scaling and rotation cycle of a preformed polygon shapes are defined.

For example, an enlargement stop condition (devised for stopping the scaling up of the zero order preformed polygon shape 1305) may occur whether it is verified that:

$$Y = X \cup Y. \tag{3}$$

Similarly, a shrinking stop condition (devised for stopping the scaling down of the zero order preformed polygon shape 1305) may occur whether it is verified that:

$$X = X \cup Y. \tag{4}$$

It should be noted that, alternatively, the preformed polygon shapes may be first scaled and then rotated, i.e. the order rotation and scaling procedures may be swapped without affecting the pattern recognition criterion. It should be further noted that the different stop conditions for the scaling up/down of the preformed polygon shapes may be provided in addition or as an alternative to the stop conditions described above.

Directional Criterion

The directional criterion is based on an identification of actual walls of the buildings 105 in the geographic area represented in the raster database 200 by a respective group 205 of building pixels.

The identification of actual walls of buildings is based on the analysis of the trivial polygon.

For example, a candidate polygon is generated from the trivial polygon in such a way that each vertex of the candidate polygon corresponds to a vertex of the trivial polygon at which a substantial change in an average orientation of the sides of the trivial polygon is detected (as described in the following).

The average orientation of a side of the trivial polygon may be evaluated based on the comparison of the orientation between groups of sides of the trivial polygon. In an embodiment of the invention, each group considered comprises two adjacent sides of the trivial polygon.

In an embodiment of the invention, the directional criterion exploits a Cartesian coordinates set. The coordinates of the Cartesian coordinate set are aligned with the alignment directions of the sides of a trivial polygons 1405 identified by a group 205 of building pixels in the raster database 200 as shown in FIG. 14.

Figure 14:
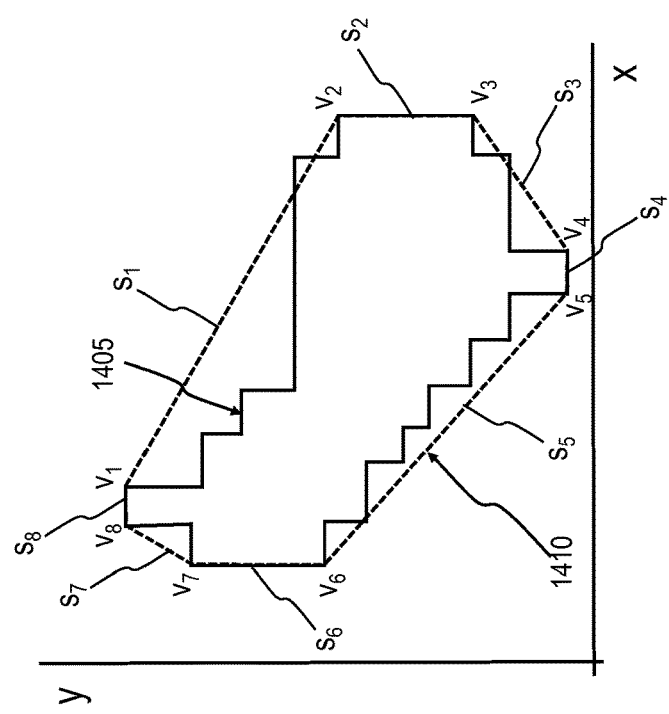
FIG. 14 is schematic and graphic representation of a candidate polygon for a considered trivial polygon according to a directional criterion.

For the generic trivial polygon 1405 being analyzed, as shown in FIG. 14, an initial vertex v1 of the trivial polygon 1405 is chosen as a first vertex of a corresponding candidate polygon 1410.

Subsequently, proceeding either clockwise or counter-clockwise, the orientation of couples of sides of the trivial polygon 1405 are analyzed starting from a couple having a side adjacent to the initial vertex v1, for identifying a first substantial variation in the orientation of the sides of the trivial polygon 1405.

For example, in the trivial polygon 1405 the first four couples of side proceeding clockwise from the initial vertex v1 have the same orientations along the coordinates of the Cartesian coordinates set (i.e., −y; +x). Therefore, the four couples of sides are simplified in a single first side s1 of the candidate polygon.

The first side s1 extends from the initial vertex v1 to a second vertex v2 of the candidate polygon 1410. In detail, the second vertex v2 is determined by detecting a variation in the directions of couples of sides of the trivial polygon 1405. Indeed, the sides of the trivial polygon 1405 following the second vertex v2 have a different orientation (i.e., −y; $x_2$, where $x_2$ denotes a fixed abscissa) with respect to the first four couples of sides of the trivial polygon 1405.

Similarly, a third vertex v3 of the candidate polygon 1410 is determined by detecting a change in the direction (i.e., −y; −x) of the following sides of the trivial polygon 1405 and, thus, between the second vertex v2 and the third vertex v3 a second side s2 of the candidate polygon is determined.

The analysis of the trivial polygon then proceeds in a similar manner as described above, identifying further five vertices v4 to v8 and six sides s3 to s7, in the example of FIG. 14, each positioned between consecutive vertices, and a final side s8 connecting the last vertex v8 to the initial vertex v1, thus completing the candidate polygon 1410.

Subsequently, different candidate polygons (not shown) are, preferably, generated each polygon exploiting a different vertex of the trivial polygon as the respective initial vertex. Therefore, the directional criterion allows generating a number of candidate polygons for each trivial polygon equal to a number of vertices of the latter.

Finally, the quality indicator Q for each candidate polygon is computed.

According to the present invention, only one, two or all the three criteria described above may be implemented for determining an optimal polygon for modelling a corresponding building 105 in the geographic area 100. For example, the optimal polygon is the candidate polygon having the highest quality indicator Q among the candidate polygons provided by the three criteria—each of which has the highest quality indicator Q among the candidate polygons obtained with the same criterion.

Consequently, the raster database 200 is used for defining a vectorial database (not shown) comprising a corresponding optimal polygon for each building 105 of the geographic area 100 represented in the raster database 200 by a respective group 205 of building pixels.

The vectorial database further comprises a height information for each building 105 in the geographic area 100, that are thus represented as prisms (not shown) having bases corresponding to the optimal polygon for the building and the height corresponding to a (average) height of the building 105.

In addition, the non-building pixels of the raster database 200 are modelled as a ground surface of the geographic area.

Therefore, the vectorial database provides a three-dimensional model of the geographic area 100.

The vectorial database is then processed in order to obtain a description in terms of geometrical optics features, or a geometrical visibility, of the geographic area 100.

For example, the model of the geographic area 100 described by the vectorial database is subdivided in elementary portions, or Primary Elements PE.

Particularly, each face of the prisms (i.e., the walls of the building 105) comprised in the vectorial database is divided in quadrangles (e.g., rectangles), or face Primary Elements fPE, the edges of the prisms are divided in segments, or edge Primary Elements ePE, and the surface of the ground (e.g., corresponding to non-building pixels of the raster database 200) is divided in further quadrangles (e.g., squares), or ground Primary Elements gPE.

According to embodiments of the present invention, further Primary Elements are considered. Particularly, virtual Primary Elements vPE are modelled.

For example, the virtual Primary Elements vPE are defined as Primary Elements PE that do not generate interactions (such as reflection or refraction) with electromagnetic radiation propagated by the Radio Base Stations of the radio communication network being evaluated (which are, at least initially, considered as rays or rays beam as described in the following). Conversely, the virtual Primary Elements vPE are used for evaluating the propagation channel; i.e., the virtual Primary Elements vPE are considered destinations of electromagnetic radiation.

Preferably, the virtual Primary Elements vPE are aligned with, and corresponds to, respective ground Primary Elements gPE and are, preferably, positioned at a predetermined height (e.g., 1.5 m that is substantially an average height at which the UE are carried) from a ground surface (i.e., from the respective ground Primary Elements gPE).

Moreover, only a center (i.e., barycenter) of the virtual Primary Element vPE is considered for assessing the propagation channel (i.e., the virtual Primary Element vPE is substantially a point defined by a set of coordinates of the model of the vectorial database). It should be noted that the center of each virtual Primary Element PE is aligned with the barycenter of the corresponding ground Primary Element.

In an embodiment of the invention, virtual Primary Elements vPE lie on a virtual plane parallel to a ground plane on which the ground Primary Elements gPE lie, since each virtual Primary Element vPE is a point located at the predetermined height transversally (e.g., perpendicular to) to a barycenter of a corresponding ground Primary Element gPE.

It should further be noted that the sizes (e.g., areas and/or length) of the Primary Elements PE may be assigned independently one from the other. For example, a length of the edge Primary Elements ePE may be different from a length and a width of the face Primary Elements fPE and/or of the side of the ground Primary Element gPE.

In the embodiments according to the present invention, each Primary Element PE may be defined by one or more of the following parameters:

- a univocal identifier of the Primary Element PE referred to a position within a total preprocessing area, i.e. substantially corresponding to the geographic area 100 or a portion thereof over which the radio mobile network has to be deployed or modified;
- an identifier of an analysis unit or parcel of the total preprocessing area to which the Primary Element PE belongs (described in the following);
- an identifier of the type of the Primary Element, i.e. indicating whether the Primary Element is a face Primary Element fPE, an edge Primary Element ePE, a ground Primary Element gPE or a virtual Primary Element vPE;

an identifier of a building 105 to which the Primary Element PE belongs (in case of face and edge Primary Elements fPE and ePE) referred to the preprocessing area;

if the Primary Element PE is a face Primary Element fPE, an identifier of a face of the building 105 to which the Primary Element PE belongs;

if the Primary Element PE is an edge Primary Element ePE, an identifiers of (two) faces (or a face and the roof) of the buildings 105 adjacent to the edge Primary Element ePE;

the coordinates (x, y, z) of the center of the Primary Element PE and of its vertices (e.g., a set of four coordinates for quadrangular-shaped face Primary Elements fPE and ground Primary Elements gPE, a set of two coordinates for the line-shaped edge Primary Elements ePE, and none for the point-shaped virtual Primary Elements vPE), and a relative dielectric constant and a conductivity of the Primary Element PE (e.g., based on the type of the Primary Element PE).

Geometrical visibility relationships (both direct and indirect) among Primary Elements PE are affected by a distance between a source Primary Element sPE from which a (electromagnetic radiation) ray or rays beam is irradiated and surrounding Primary Elements PE.

In other words, geometrical optics laws are used to evaluate possible paths for electromagnetic radiation.

Preferably, a distance from the source of the electromagnetic radiation (i.e., the source Primary Element sPE) is taken into account. Indeed, such distance negatively affects a power associated with the electromagnetic radiation, i.e. the electromagnetic radiation is considered waning and then vanishing as the distance from its source increases.

Therefore, according to the present invention, it is possible to perform an analysis of the visibility relationships between a source Primary Element sPE and Primary Elements PE comprised within a threshold distance (thus reducing a computing time and resources required with respect to consider all the Primary Elements in the preprocessing area).

According to an embodiment of the present invention, two or more threshold distances may be provided. Each threshold distance is associated to a respective type of the source Primary Element sPE.

Indeed, electromagnetic radiation diffracted by an edge Primary Element ePE are substantially attenuated with respect to the corresponding electromagnetic radiation incidents to the edge Primary Element ePE that generates the diffracted electromagnetic radiation. Moreover, the geometrical visibility relationship of the diffracted electromagnetic radiation is affected by the distance from the source of the radiation (i.e., the edge Primary Element ePE) more severely than how distance affects the geometry visibility relationships of direct and reflected electromagnetic radiation. Particularly, the direct electromagnetic radiation are electromagnetic radiation generated by the source Primary Element sPE passing through no Primary Elements PE or only one or more virtual Primary Elements vPE, while the reflected electromagnetic radiation are generated by face and ground Primary Elements gPE receiving a respective, incident electromagnetic radiation.

Therefore, in case of an edge Primary Element ePE as the source Primary Element sPE, the analysis of the visibility relationships performed between the edge Primary Element ePE and Primary Elements PE comprises a (first) edge distance de (e.g., in the order of the hundreds of meters, for example 100 m≤de≤500 m, such as for example 250 m).

Conversely, in case of a face source Primary Element sPE, the analysis of the visibility relationships performed between the face Primary Element fPE and Primary Elements PE comprises a (second) reflection distance dr (e.g., in the order of the several hundreds of meters, for example 500 m≤dr≤1500 m, such as for example 750 m). Finally, in case of a 'direct' source Primary Element sPE (i.e., the source Primary Element sPE and the virtual Primary Element vPE), the analysis of the visibility relationships performed between the direct source Primary Element sPE and Primary Elements PE comprises a (third) direct distance dd.

According to the present invention, the threshold distances of above may be used for defining a reduced preprocessing area, for each Primary Element PE considered (as descried in the following), i.e. a portion of the total preprocessing area, to be analyzed in order to reduce and speeding up a computational effort required to evaluate visibility relationships among Primary Elements PE.

Figure 15:
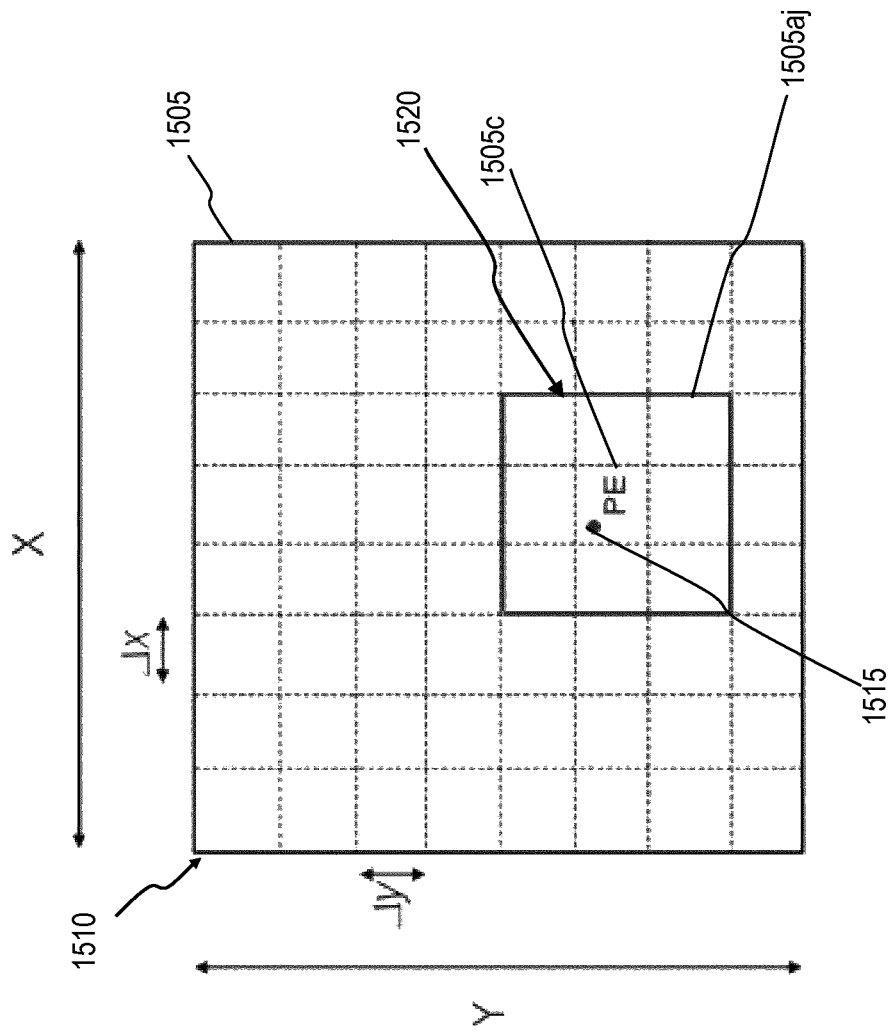
FIG. 15 is a schematic and graphic representation of a preprocessing area of the geographic area divided in a plurality of basic parcels according to an embodiment of the invention.

Preferably, the edge distance de and the reflection distance dr are used for determining the size of basic parcels 1505 in which a generic total preprocessing area 1510 is subdivided, as shown in FIG. 15.

For example, the generic basic parcel 1505 is a quadrangle with a (first) size Δx (along the abscissa axis) and a (second) size Δy (along the ordinate axis) computed in the following manner:

$$\Delta x \geq 1000\ m,\ \text{and}\ \Delta x > MAX(de, dr),\ \text{and} \tag{5}$$

$$\Delta y \geq 1000\ m,\ \text{and}\ \Delta y > MAX(de, dr) \tag{6}$$

According to an embodiment of the invention, for a given source Primary Element sPE 1515 provided in a basic parcel 1505s a corresponding reduced preprocessing area 1520 may be defined as comprising the basic parcel 1505s where the source Primary Element sPE 1515 is located and (eight) basic parcels 1505aj adjacent to the basic parcel 1505s comprising the source Primary Element sPE 1515.

In other words, components of the electromagnetic radiation generated source Primary Element sPE 1515 are considered 'useful' (i.e., having a sufficient power to be detected by a UE and exploited for a radio communication) for radio mobile communications up to a distance equal to Δx along the abscissa axis of the total preprocessing area 1510 and communications up to a distance equal to Δy along the ordinate axis of the total preprocessing area 1510.

Therefore, by selecting the reduced preprocessing area 1520 as the area comprising the basic parcel 1505s where the source Primary Element sPE 1515 is located, and the adjacent basic parcels 1505aj ensures that even if the source Primary Element sPE 1515 is located on the edge of the basic parcel 1505s all the useful components of electromagnetic radiation generated source Primary Element sPE 1515 (propagating up to a distance Δx or Δy, i.e. equal to the length of the sides of the adjacent basic parcels 1505aj) are considered.

In summary, limiting the preprocessing operation to the reduced preprocessing area 1520 comprising the basic parcel 1505s enclosing the considered source Primary Element sPE 1515 and the adjacent basic parcels 1505aj allows substantially reducing computing time and resources required for performing the evaluation of the geometrical visibility relationship between Primary Elements PE, at the same time, maintaining a high precision and accuracy in the evaluation of the geometrical visibility relationship between Primary Elements PE.

Thus, the geometrical visibility relationships for couples of Primary Elements PE are analyzed. Preferably, for each Primary Element PE, considered as a source Primary Element sPE, the geometrical visibility relationships between such source Primary Element sPE and Primary Elements PE comprised in the reduced preprocessing area 1520 having a 'direct' geometrical visibility are analyzed.

According to an embodiment of the invention, the direct geometrical visibility is verified when the centers (barycenter) of two Primary Elements PE may be connected by a straight line not intersecting any other Primary Elements PE.

It should be noted that the analysis of geometrical visibility relationships is based on three-dimensional geometry and, generally, does not require considering aspects of electromagnetic radiation propagation other than those exploited in optics. The analysis of geometrical visibility relationships for couples of Primary Elements PE may be carried out according to any procedure known in the art.

According to the present invention, an analysis of the (enhanced) geometrical visibility relationships among triplets of Primary Elements PE is also performed.

For each triplet, the analysis of geometrical visibility relationships among triplets of Primary Elements PE, preferably, comprises an analysis of geometrical visibility relationships between a pair of Primary Elements PE, i.e. a source Primary Element PEs and a destination Primary Element PEd, that are separated by the third Primary Element of the triplet, i.e. a 'through' Primary Element PEt.

It should be noted that the analysis of geometrical visibility relationships among triplets of Primary Elements PE takes into account aspects of three-dimensional geometry and aspects of electromagnetic radiation. For example, the aspects of electromagnetic radiation comprise geometric features of reflection and diffraction of electromagnetic propagation.

In other words, the source and destination Primary Elements PEs and PEd have an 'indirect' geometrical visibility one with the other by means of the through Primary Element PEt. At the same time, both the source and destination Primary Elements PEs and PEd have a direct geometrical visibility with the through Primary Element PEt.

Further, the geometrical visibility relationships among triplets of Primary Elements PE are bidirectional. In other words, each geometrical visibility relationships identified between a source Primary Element PEs and a destination Primary Element PEd and between the former two primary elements and the through Primary Element PEt still hold, mutatis mutandis, whether the source Primary Element PEs and the destination Primary Element PEd are switched one with the other (i.e., the original source Primary Element PEs is switched to operate as the destination PEd and the original destination Primary Element PEd is switched to operate as the source Primary Element PEs).

Preferably, geometrical visibility relationships between couples of Primary Elements PE and among triplets of Primary Elements PE are determined once for the total preprocessing area (i.e., the geographic area 100).

Advantageously, the results of the analysis of geometric visibility relationships are stored and organized in one or more corresponding databases (as described in the following) and used for simulating one or more deployment and/or modification of radio communication networks within the geographic area 100.

In this way, it is possible to sensibly reducing a computational effort in identifying an efficient deployment and/or modification strategy for the radio base stations of the radio communication network (e.g., ensuring a satisfactory service provisioning within the geographic area with the minimum number of radio base stations) since substantially all the geometric visibility relationships among Primary Elements PE of the total preprocessing area 1510 are known through the one or more corresponding databases.

Evaluation of Triplets of Primary Elements Based on Reflections

According to an embodiment of the present invention, the following assumptions are made:

the surfaces of the Primary Elements PE are considered to be substantially flat and smooth;

the reflection analysis is based on the geometrical optics, e.g. a reflection angle of reflected ray or rays beam (i.e., components of electromagnetic radiation that are considered behaving substantially as optics rays, or simply rays, in the analysis of reflection) is equal to an incidence angle of corresponding incident ray with respect to a perpendicular line to the surface of the Primary Element PE;

both the source and destination Primary Elements PEs and PEd have a direct geometrical visibility with the through Primary Element PEt, and rays are generated from the center of the source Primary Element PEs, while reflection may occur at any points of the surface of the through Primary Element PEt, therefore a (divergent) reflected rays beam emerges from the through Primary Element PEt as a reflection of corresponding incident rays beam generated by the source Primary Element PEs.

Under these assumptions, it should be noted that for one or more reflection of incident ray or rays beam might lack any destination Primary Elements PEd or, conversely, the reflection of rays may comprise a plurality of destination Primary Elements PEd.

For example, the lack of destination Primary Elements PE may occur when a rays beam reaches the through Primary Element PEt from below, i.e. the source Primary Element PEs is closer to the ground of the geographic area 100 than the through Primary Element PEt. Particularly, the reflected rays beam generated by the reflection of the incident rays beam are reflected in a direction, e.g. upwards (i.e., in the opposite direction with respect to the ground), where no Primary Elements PE are reached.

Figure 16:
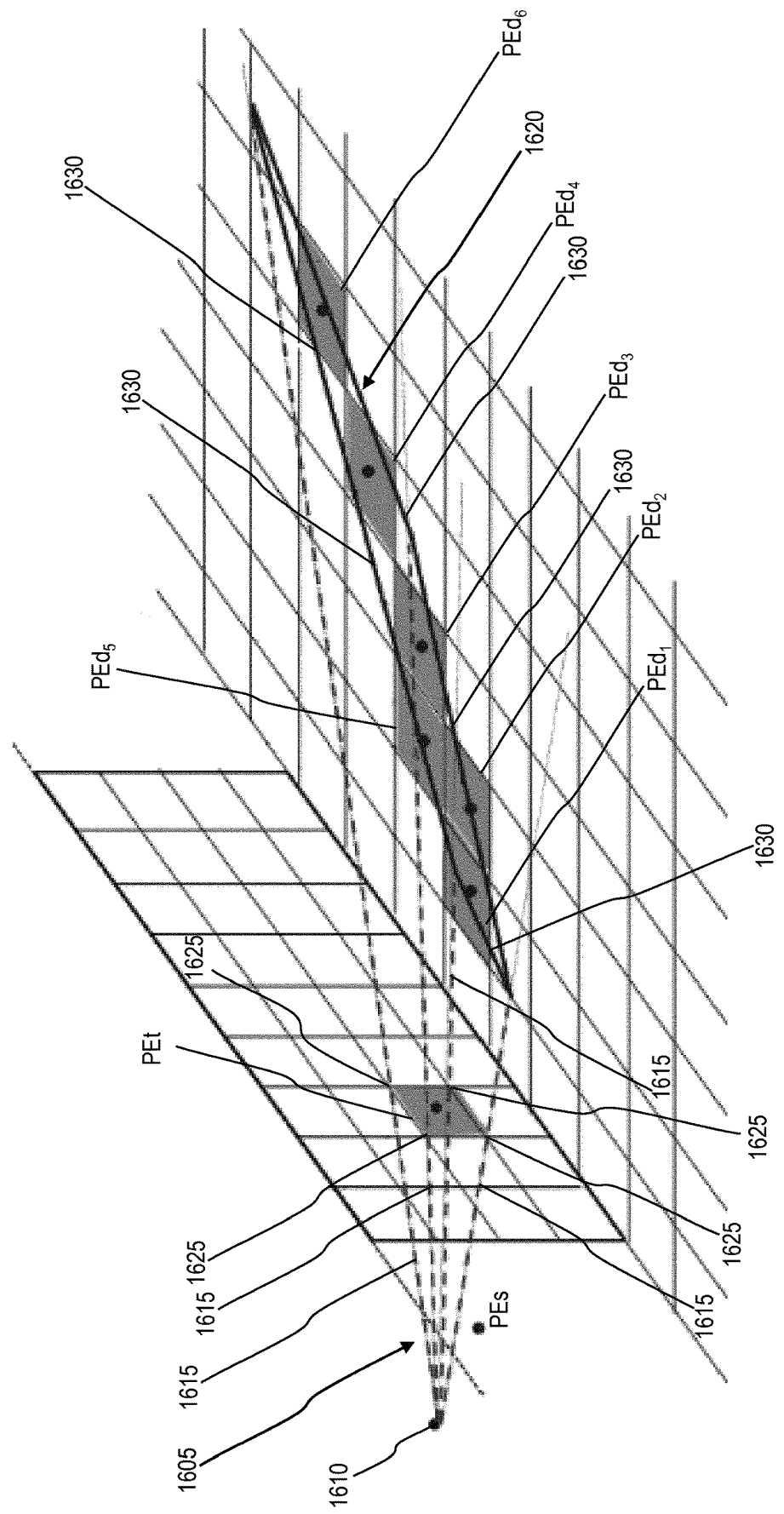
FIG. 16 is a schematic and graphic representation of the evaluation of a reflection according to an embodiment of the invention.

On the contrary, a plurality of destination Primary Elements PEd may be identified when, for example, the through Primary Element PEt comprises a surface of a building the rays of a reflected rays beam may reach a plurality of destination Primary Elements PEd, for example, ground Primary Elements gPE as shown in FIG. 16.

FIG. 16 is a portion of the geographic area 100 in which rays beam generated by a source Primary Element PEs are reflected by a through Primary Element PEt towards a plurality of destination Primary Elements PEd.

The plurality destination Primary Elements PEd are identified as the Primary Elements PE which center is enclosed in volume of a reflection pyramid 1605. In the example of FIG. 16, the reflection pyramid 1605 comprises a pyramid apex 1610, four pyramid edges 1615 and a pyramid base 1620.

Particularly, the pyramid apex 1610 corresponds to an image point obtained from the source Primary Element PEs according to optic physics laws. Each pyramid edge 1615 is a segment of a straight-line passing through the pyramid apex 1610 and through a respective one of the vertices 1625 of the through Primary Element PEt and reaching a further Primary Element PE. Accordingly, the pyramid base 1620 is delimited by (four) base edges 1630 connecting the points of intersection between each pyramid edge 1615 and a corresponding further Primary Element PE.

In the example of FIG. 16, the pyramid base 1620 lies on ground Primary Elements PE of the geographic area. Particularly, six ground Primary Elements gPE have their centers within the pyramid volume (i.e., within the perimeter of the pyramid base 1620 in the example of FIG. 16) and are therefore identified as destination Primary Elements $PEd_{1-6}$ for the rays beam generated by the source Primary Element PEs and reflected by the through Primary Element PEt.

Moreover, also a number of virtual Primary Elements PE (not shown in FIG. 16 for the sake of simplicity) are enclosed in the volume of the reflection pyramid 1605 and are therefore considered to as destination Primary Elements for the ray beams generated by the source Primary Element PE and reflected by the through Primary Element PE.

It should be noted that the virtual Primary Elements vPE within the volume of the reflection pyramid 1605 do not hinder ray or rays beam since they are substantially dimensionless points and transparent to electromagnetic radiation.

Therefore, the source Primary Element PEs and the through Primary Element PEt form a plurality of triplets with respective destination Primary Elements PEd. Particularly, the source Primary Element PEs and the through Primary Element PEt form a respective triplet with each destination Primary Element PEd comprised in the volume of the reflection pyramid.

Evaluation of Triplets of Primary Elements based on Diffractions

In an embodiment of the present invention, the evaluation of triplets of Primary Elements based on diffraction phenomena may exploit known theories and procedures.

For example, an embodiment of the present invention implements the Geometrical Theory of Diffraction, or GTD, in order to evaluate diffraction generated by edge Primary Elements ePE in the geographic area 100. The GTD is described J. B. Keller, "Geometrical Theory of Diffraction", Journal of the Optical Society of America, vol. 52, N. 2, pp. 116-130, 1962, and provides a model of diffraction phenomena based on rays beam (similarly as per the reflection described above).

It should be noted that the embodiments of the present invention are not limited to implement the GTD. Indeed, embodiments of the invention exploiting different models for evaluating the diffraction of electromagnetic radiation hitting an edge Primary Element PE may be devised. For example, the Uniform Theory of Diffraction, or UTD, described in R. G. Kouyoumjian, P. H. Pathak, "A Uniform Geometrical Theory of Diffraction for an Edge in a Perfectly Conducting Surface", Proceedings of the IEEE, Vol. 62, N. 11, November 1974, may be exploited instead of GTD.

According to GTD (or UTD) a diffracted ray, or rays beam, and the corresponding incident ray, or rays beam, form corresponding (e.g., equal) angles with the edge Primary Element ePE at the diffraction point along the edge Primary Element ePE and lay on opposite sides (with respect to the edge Primary Element ePE) of the plane perpendicular to the edge Primary Element ePE.

Each incidence ray generates an infinite number of diffracted rays that are diffracted along a side surface of a cone with an apex corresponding with the diffraction point of the incidence ray on the edge Primary Element ePE, an axis corresponding to the edge Primary Element ePE, and an apex angle equal to the double of the incidence angle of the incidence ray.

According to an embodiment of the present invention, the following assumptions are made:
the surfaces of the Primary Elements PE are considered to be flat and smooth;
both the source and destination Primary Elements PEs and PEd have a direct geometrical visibility with the through Primary Element PEt;
the source Primary Element PEs emits rays beam from its center;
the diffraction is assumed to occur at any point of the edge Primary Element ePE, and
the diffraction cones are infinite and are comprised between the cones that have respective apexes at the (opposite) ends of the edge segment comprised in the considered edge Primary Element ePE.

Under this assumptions (similarly to the assumption made for the reflection described above), a diffraction may lack of any destination Primary Elements PEd or comprising a plurality of destination Primary Elements PEd, according to the relative positions of the source Primary element PEs and of the through Primary Element PEt considered.

In an embodiment of the invention, destination Primary Elements PEd in diffraction triplets are those Primary elements PE lying within the volume comprised between the side surfaces of cones that have as respective apexes the ends of the edge segment comprised in the considered edge Primary Element ePE.

Figure 17:
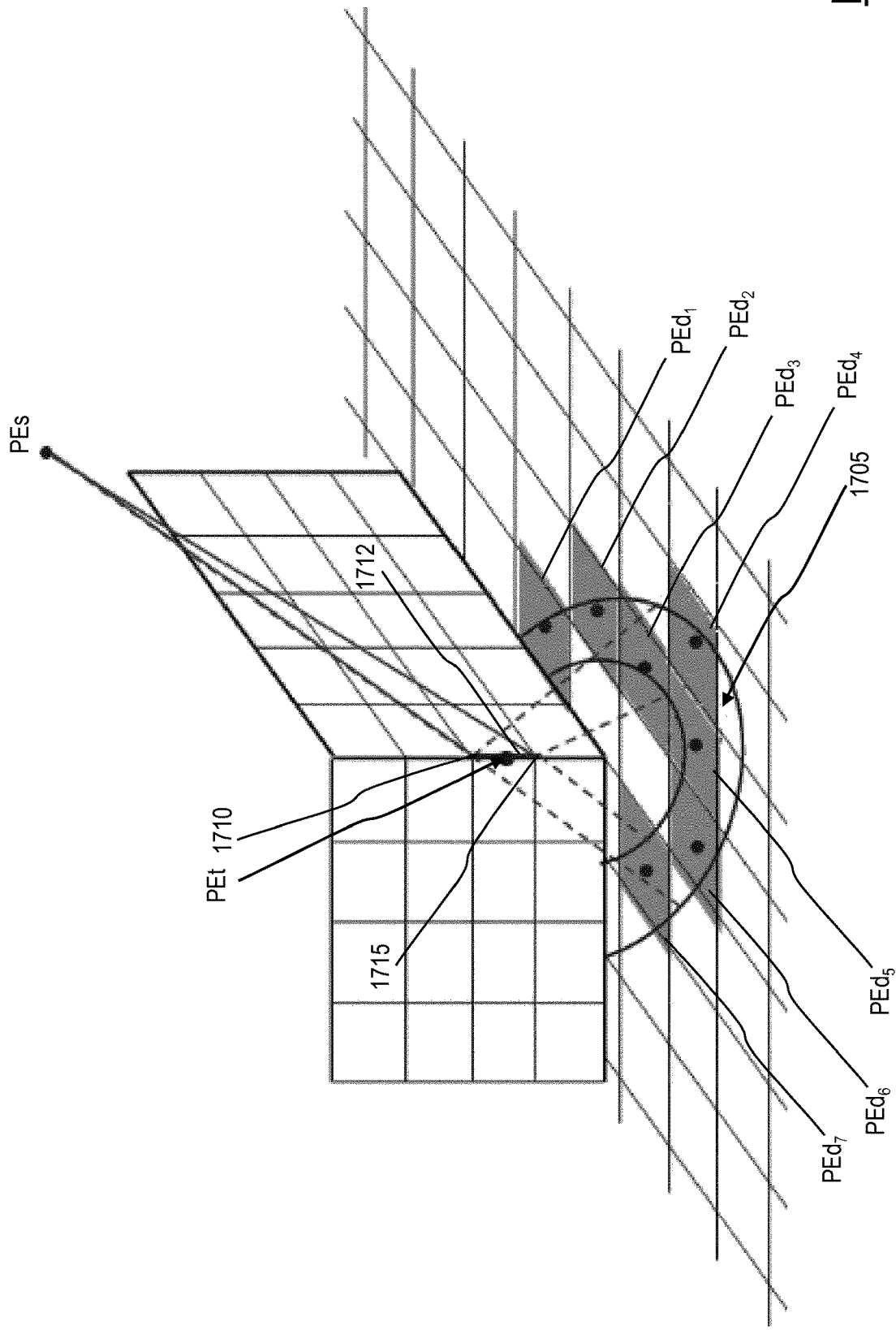
FIG. 17 is a schematic and graphic representation of the evaluation of a diffraction according to an embodiment of the invention.

For example, FIG. 17 is a portion of the modelled geographic area 100 in which rays beam generated by a source Primary Element PEs are diffracted by a through Primary Element PEt towards a plurality of destination Primary Elements PEd.

In the example of FIG. 17, the source Primary Element PEs is positioned above the through Primary Element PEt (an edge Primary Element ePE) with respect to the ground. Therefore, the diffraction cones are directed downwards, e.g. towards the ground and ground Primary Elements gPE dividing the ground.

The ground Primary Elements gPE having a respective center comprised in a diffraction annulus portion 1705 are identified as destination Primary Elements PEd for diffracted rays. The annulus portion 1705 is defined by the perimeters of a first diffraction cone, having an apex 1710 at a first end of an edge segment 1712 of the through Primary Element PEt, and of a second diffraction cone having a respective apex 1715 at a second end of the edge segment 1712 of the through Primary Element PEt.

In addition, also the virtual Primary Elements vPE (not shown for the sake of simplicity) within a volume comprised between the side surfaces of the cones with the apexes 1710 and 1715 are identified as destination Primary Elements PEd for diffracted rays.

Therefore, the source Primary Element PEs and the through Primary Element PEt form a plurality of triplets with respective destination Primary Elements PEd. Particularly, the source Primary Element PEs and the through Primary Element PEt form a respective triplet with each destination Primary Element PEd enclosed in the volume comprised between the side surfaces of the cones with the apexes 1710 and 1715.

Geometrical Visibility Relationships Data Bases

In an embodiment of the present invention, the geometrical visibility relationships for both couples and triplets of Primary Elements PE are preferably organized as one or more visibility databases. In other words, one or more visibility databases comprise information about geometrical visibility relationships between couples of Primary Elements and information about geometrical visibility relationships among triplets of Primary Elements.

Preferably, separate couple visibility database(s) and triplets visibility database(s) are provided. Each couple visibility database comprises information regarding geometrical visibility relationships between couples of Primary Elements, while each triplets visibility database comprises information regarding geometrical visibility relationships among triplets of Primary Elements.

In a preferred embodiment of the invention, each visibility database comprise pairs of files, a (large) data file comprising geometric visibility relationships information and an indexing file arranged for rapidly access the geometric visibility relationships information comprised in the data file (as described in the following).

Preferably, a plurality of visibility databases are provided both for couples and triplets of Primary Elements PE. Even more preferably, a respective visibility database (comprising a respective pair of files) is provided for each basic parcel 1505 subdividing the modelled geographic area. In other words, each visibility database comprise information about geometrical visibility relationships between couples, or among triplets, of Primary Elements PE comprised in the respective basic parcel 1505.

Figure 18:
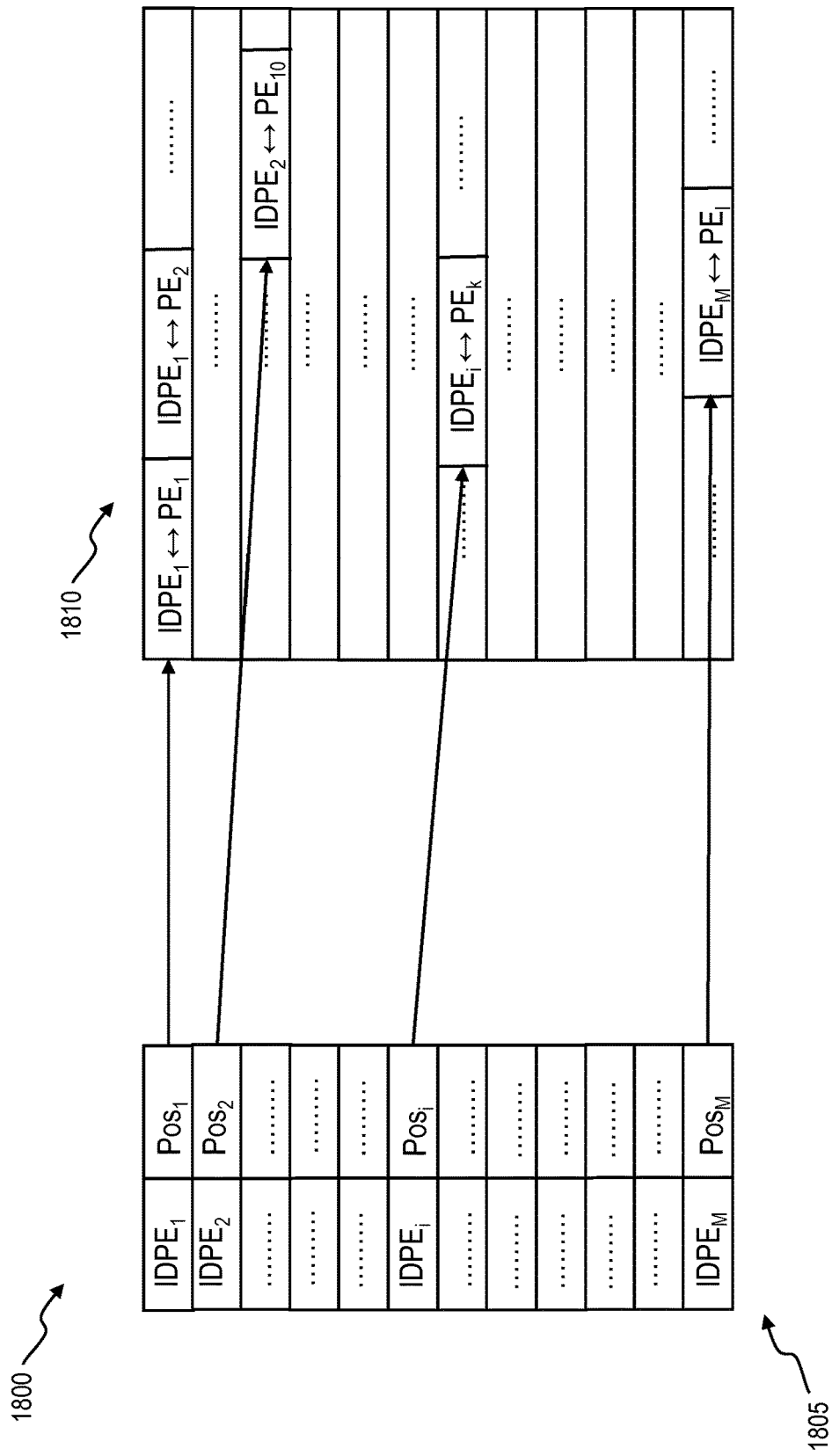
FIG. 18 is a schematic representation of an indexing file and of a data file belonging to a couples visibility database referred to a generic basic parcel.

FIG. 18 is a schematic representation of a (first) indexing file 1805 and of a (second) data file 1810 belonging to a couples visibility database 1800 referred to a generic basic parcel 1505.

In the example of FIG. 18, the indexing file 1805 substantially comprises a vector of identifiers $IDPE_{1-M}$ (with M positive integer corresponding to a total number of Primary Elements PE within the basic parcel 1505), each identifier $IDPE_{1-M}$ univocally identifying a respective Primary Element PE comprised in the basic parcel 1505. Moreover, the indexing file 1805 comprises an address $Pos_{1-M}$ (e.g., represented by a string of bits) associated with each one of the identifiers $IDPE_{1-M}$. Each address $Pos_{1-M}$ provides a position within the data file 1810 of geometrical visibility information regarding the Primary Element PE identified by corresponding identifier $IDPE_{1-M}$.

Preferably, the indexing file 1805 is designed as a light (e.g., in terms of byte size), and fast-access file. For example, the indexing file 1805 is implemented as a sequential access file.

The indexing file 1805 allows accessing in a fast and efficient way desired information in the data file 1810, i.e. without the need for parsing the great amount of information contained in the data file 1810.

The data file 1810 of the couple visibility database 1800 stores information regarding geometrical visibility referred to each one of the M Primary Elements PE of the respective basic parcel 1505 listed in the first file 1805 by means of the corresponding identifiers $IDPE_{1-M}$.

In an embodiment of the invention, for each Primary Element PE listed in the indexing file 1805, the data file 1810 comprises one or more visibility identifiers VID 1815, each identifying a respective Primary Element PE having a geometrical visibility relationship with the considered Primary Element PE listed in the indexing file 1805.

Advantageously, the address $Pos_{1-M}$ in the indexing file 1805 provides the position of one or more visibility identifiers VID 1815 in the data file 1810. Preferably, address $Pos_{1-M}$ provides the position of at least a first visibility identifier VID 1815 associated with the considered Primary Element PE listed in the indexing file 1805.

Preferably, the one or more visibility identifiers VID 1815 in the data file 1810 are referred to any Primary Elements PE within the analysis zone 1520 of the preprocessing area 1510 centered on the basic parcel 1505s comprising the considered Primary Element PE listed in the indexing file 1805 (i.e., the basic parcel 1505s comprising the considered Primary Element PE and the eight adjacent basic parcels 1505aj as described above).

Thanks to the indexing file 1805, the access to information comprised in the data file 1810 is optimized. Indeed, the identifiers $IDPE_{1-M}$ in the indexing file 1805 indexes the position of information in the data file 1810 providing means for fast accessing to required information.

For example, a required geometrical visibility information stored in the data file 1810 of the couples visibility database 1800 may be accessed in the following manner.

The identifiers $IDPE_{1-M}$ in the indexing file 1805 are sequentially read until the identifier $IDPE_i$ corresponding to a desired Primary Element PE comprised in the basic parcel 1505 is found.

Then, an address $Pos_i$ associated with the identifier $IDPE_i$ in the indexing file 1805 is exploited for directly accessing the data file 1810 at the position of the desired geometrical visibility information. In this way, it is possible to access to desired geometrical visibility information in the large (in terms of bit size) data file 1810 in a fast and efficient manner.

Figure 19:
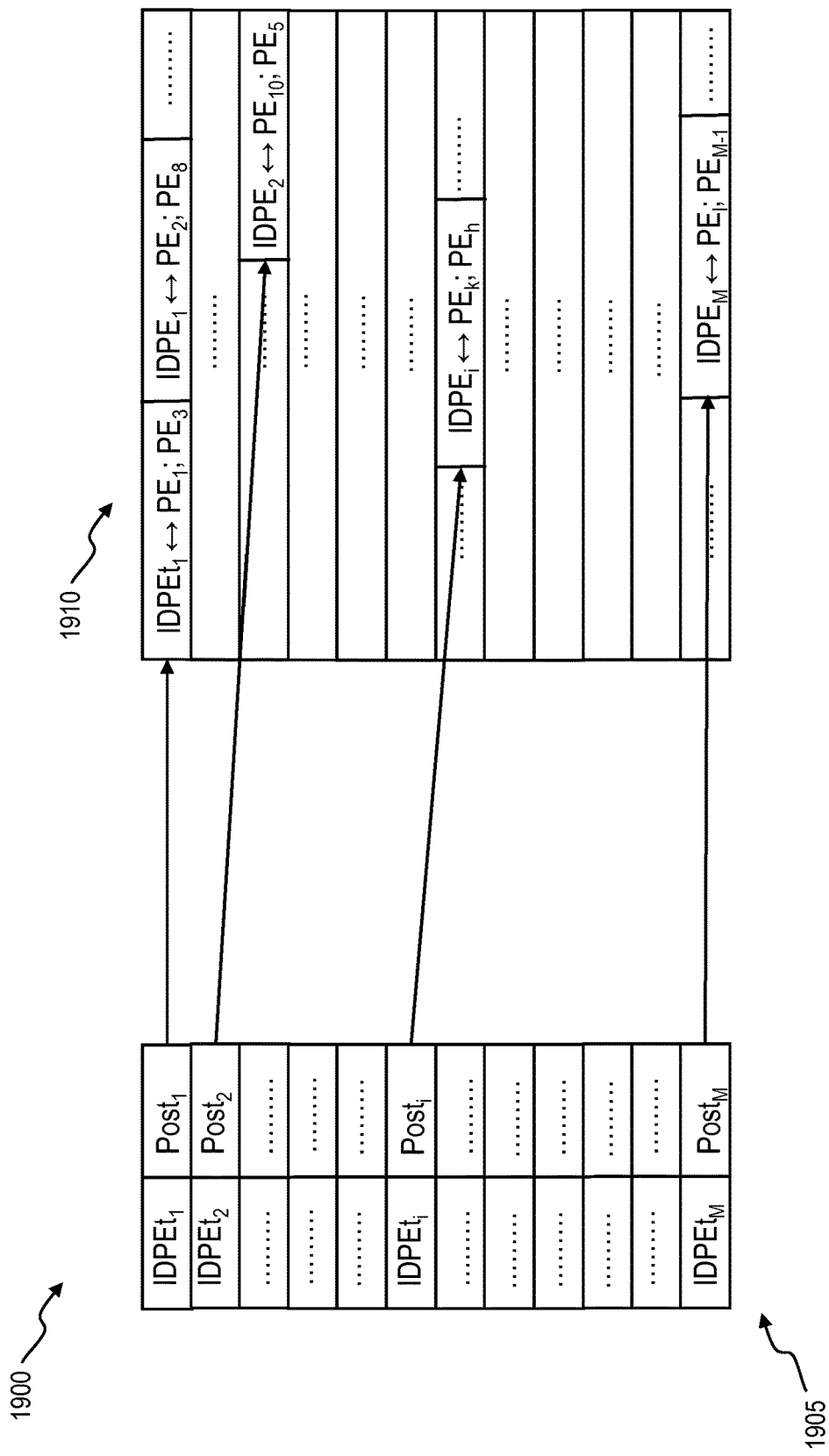
FIG. 19 is a schematic representation of an indexing file and of a data file belonging to a triplets visibility database referred to a generic basic parcel.

FIG. 19 is a schematic representation of a (first) indexing file 1905 and of a (second) data file 1910 belonging to a triplets visibility database 1900 referred to a generic basic parcel.

In the example of FIG. 19, the indexing file 1905 substantially comprises a vector of through identifiers $IDPEt_{1-M}$, each through identifier $IDPE_{1-M}$ univocally identifying a respective through Primary Element $PEt_{1-M}$ comprised in the considered basic parcel 1505. Moreover, the indexing file 1905 comprises a through address $Post_{1-M}$ (e.g., represented by a string of bits) associated with each one of the through identifiers $IDPEt_{1-M}$. Each through address $Post_{1-M}$ provides a position within the data file 1910 of geometrical visibility information regarding the through Primary Element PEt identified by corresponding identifier $IDPEt_{1-M}$.

Preferably, the indexing file 1905 is designed as a light (e.g., in terms of byte size), and fast-access file. For example, the indexing file 1905 is implemented as a sequential access file.

The indexing file 1905 allows accessing desired information in the data file 1910 in a direct manner, i.e. without the need for parsing the great amount of information contained in the data file 1910 in a fast and efficient way.

The data file 1910 of the triplets visibility database 1900 stores the information regarding geometrical visibility referred to each one of the M through Primary Elements PEt listed in the indexing file 1905 (i.e., by means of the corresponding through identifiers $IDPEt_{1-M}$).

In an embodiment of the invention, for each through Primary Element PEt listed in the indexing file 1905, the data file 1910 comprises one or more through visibility identifiers VID 1915, each identifying a respective couple of Primary Elements PE having a geometrical visibility relationship one with the other through the through Primary Element PEt listed in the indexing file 1905. Particularly, the couple of Primary Elements PE comprises a source Primary Element PEs and a destination Primary Element PEd. As noted above, the kind, i.e. source or destination, of the Primary Elements PE is interchangeable between the Primary Elements PE of the couple, since the geometrical visibility relationships are reciprocal.

Advantageously, the through address $Post_{1-M}$ in the indexing file 1905 provides the position of the one or more visibility identifiers VID in the data file 1910. Preferably, through address $Post_{1-M}$ provides the position of at least one first visibility identifier VID 1915, associated with the corresponding Primary Element PE listed in the indexing file 1905.

Preferably, the one or more visibility identifiers VID in the second file 1910 are referred to any Primary Elements PE within the analysis zone 1520 of the preprocessing area 1510 centered on the basic parcel 1505s comprising the considered through Primary Element PE listed in the indexing file 1905 (i.e., the basic parcel 1505s comprising the considered through Primary Element PEt and the eight adjacent basic parcels 1505aj as described above).

Thanks to the indexing file 1905, the access to data comprised in the data file 1910 is optimized. Indeed, the through identifiers IDPEt$_{1-M}$ in the indexing file 1905 index the geometrical visibility information in the second file 1910 providing means for fast accessing to required information.

For example, a required geometrical visibility information stored in the data file 1910 of the triplets visibility database 1900 may be accessed in the following manner.

The through identifiers IDPEt$_{1-M}$ in the indexing file 1905 are sequentially read until a through identifier IDPEt$_i$ corresponding to a desired through Primary Element PEt is found.

Then, a through address Post associated with the through identifier IDPEt$_i$ in the indexing file 1905 is exploited for directly accessing the large data file 1910 at the position of the desired geometrical visibility information regarding the desired through Primary Element PEt corresponding to the through identifier IDPEt$_i$. In this way, it is possible to access to desired geometrical visibility information in the large (in terms of bit size) data file 1910 in a fast and efficient manner.

In an embodiment of the invention, firstly the couples visibility databases 1800 are generated and exploited building the triplets visibility database 1900. For example, the couples visibility databases 1800 may be exploited for identifying possible source Primary Elements PEs and destination Primary Elements PEd for a given through Primary Element PEt directly visible or, alternatively, for identifying possible through Primary Elements PEt given a source Primary Element PEs (or destination Primary Element PEd). In this manner, a fast and reliable identification of triplets of Primary Elements PE is achieved.

According to the present invention, the geographic area 100 is analyzed, and a set of one or more visibility databases is generated for describing the geometrical visibility relationships among Primary Elements PE comprised in the model of the geographic area 100 obtained as described above. It should be noted that the geometrical visibility relationships are based on the features of the geographic area 100 (e.g., geographic structure, building, artefacts, etc.) and on geometrical optics (e.g., reflection and diffraction).

Therefore, it is possible to evaluate the propagation channel of a Radio Base Station RBS by exploiting the model of the geographic area 100 provided by the one or more triplets visibility databases 1900 (and, possibly, by the couples visibility databases 1800) and operating information (e.g., transmission power, allocated frequency bands, etc.) regarding the Radio Base Station RBS.

Figure 20:
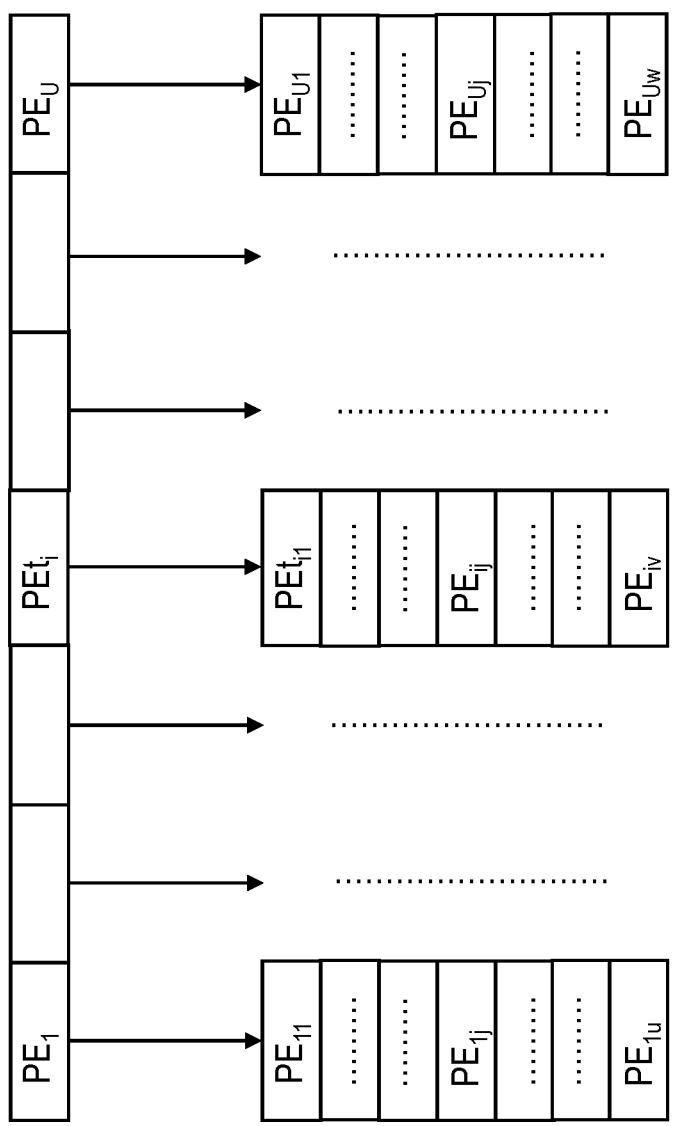
FIG. 20 is a schematic representation of an evaluation of geometrical visibility relationships associated with a Radio Base Station according to the present invention.

FIG. 20 is a schematic representation of an evaluation of geometrical visibility relationships associated with a Radio Base Station RBS according to the present invention.

In an embodiment of the invention, the effects of implementing a generic Radio Base Station RBS of the radio communication network in a considered position in the geographic area 100 are evaluated in the following manner.

The Radio Base Station RBS is modeled as a special Primary Element PE, i.e. radio Primary Element rPE, compliant with the Primary Elements PE of the model of the preprocessing area 1510. The geometrical visibility relationships between the radio Primary Element rPE and the Primary Elements PE of the model of the preprocessing area 1510 (e.g., the whole geographic area 100) are evaluated.

Preferably, the radio Primary Element rPE comprises peculiar features with respect to others Primary Elements PE.

For example, the radio Primary Element rPE is treated as a point positioned at given coordinates in the geographic area 100. The radio Primary Element rPE may have only the role of source Primary Element PEs, since radio Primary Element rPE represents an electromagnetic radiation source (i.e., a Radio Base Station RBS of the radio mobile network having known electromagnetic radiation features). In view of the above, the radio Primary Element rPE does not produce reflection and diffraction phenomena; accordingly, reflection and diffraction at the radio Primary Element rPE are not evaluated.

Figure 21:
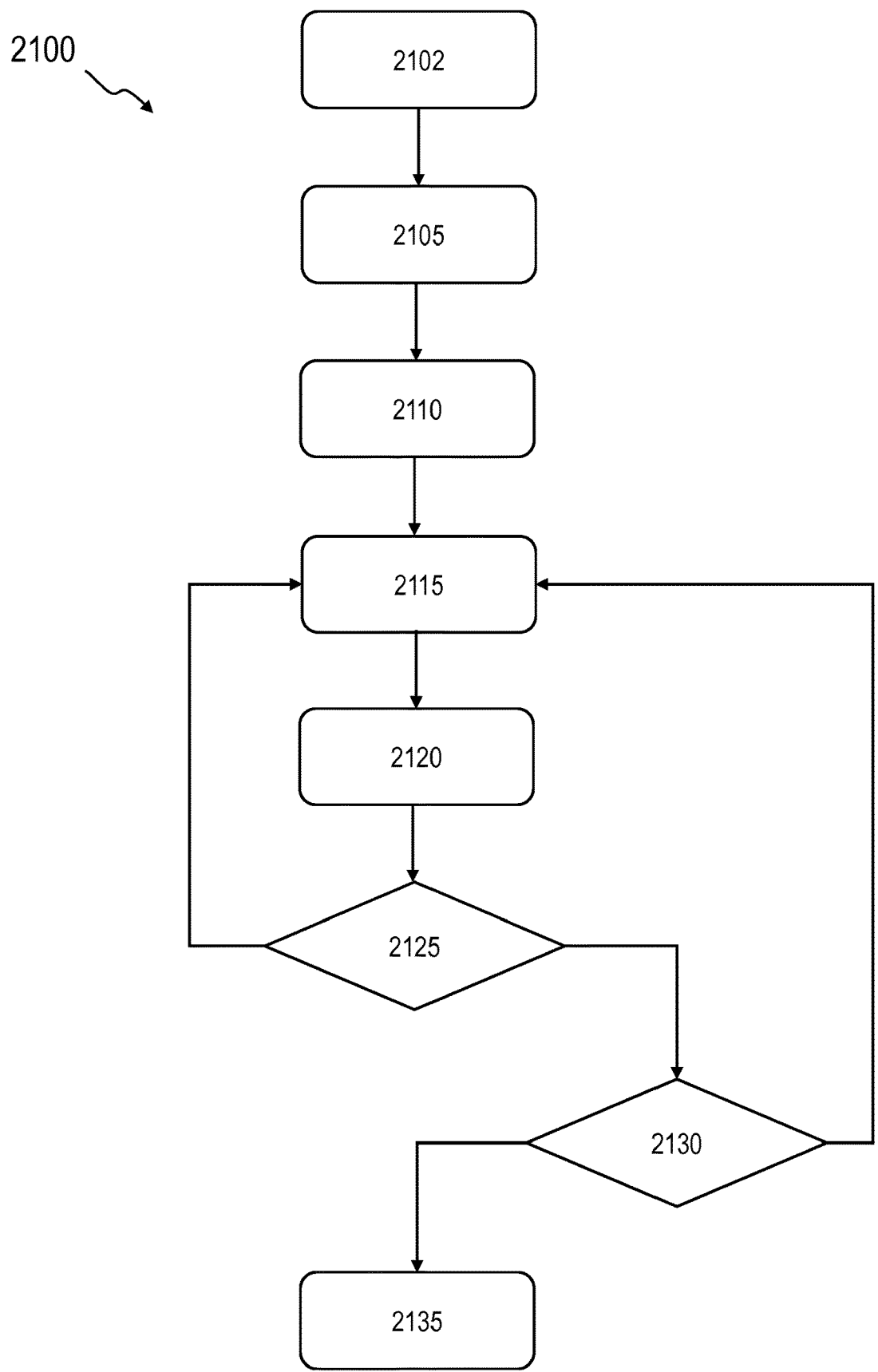
FIG. 21 is a schematic flowchart of procedure for evaluating a propagation channel of components of electromagnetic radiation generated by a Radio Base Station in the geographic area.

As shown in the example of FIG. 20 and FIG. 21, which are a schematic representation of the evaluation of geometric visibility relationship for a generic radio Primary Element rPE and a schematic flowchart of a procedure 2100 for evaluating the propagation channel of the generic radio Primary Element rPE, initially (block 2102), visible Primary Elements PE$_{1-U}$ directly visible by the radio Primary Element rPE are evaluated (i.e., the Primary Elements PE having a direct visibility relationship with the radio Primary Element rPE are identified). In an embodiment of the invention, the evaluation is performed on the whole preprocessing area 1510, i.e. without taking into account any distance limitations.

Advantageously, the knowledge of the visible Primary Elements PE$_{1-U}$ (comprising the virtual Primary Elements vPE) directly visible by the radio Primary Element rPE allows determining the components of the electromagnetic radiation, emitted by the radio Primary Element rPE, to be considered and which to be disregarded. Preferably, only the components of the electromagnetic radiation reaching a Primary Element PE are considered.

Afterwards, the enhanced geometrical visibility relationships among triplets of Primary Elements PE related to the radio Primary Element rPE are considered (block 2105).

In an embodiment of the invention, each triplet initially evaluated comprises a Primary Element PE among the visible Primary Elements PE$_{1-U}$ (in the example of FIG. 20) directly visible by the radio Primary Element rPE as the through Primary Element PEt of the triplet and the radio Primary Element rPE as the source Primary Element PEs of the triplet.

Therefore, one or more subsequent Primary Elements PE, such as the Primary Elements PE$_{1-U,1}$ in the example of FIG. 20, are identified as destination Primary Elements PEd based on procedures similar to what described above with respect to FIGS. 16 and 17. In other words, the Primary Elements PE$_{1-U,1}$ are identified as destination Primary Elements PEd based on analysis of reflection and/or diffraction.

In summary, for each one of the visible Primary Elements PE$_{1-U}$ one or more triplets of Primary Elements PE are identified, each triplet having the respective visible Primary Elements PE$_{1-U}$ as the through Primary Element PEt. It should be noted that could happen, even though improbable, that all the rays, or rays beam, emerging from a visible Primary Elements PE$_{1-U}$ does not reach any destination Primary Element PEd, e.g. in case all the reflected or diffracted rays go astray towards the sky.

Afterwards (block 2110), a new group of one or more triplets is evaluated. Each triplet comprises a respective visible Primary Element $PE_{1-U}$ as the source Primary Element sPE, and a respective successive Primary Element $PE_{1-U,1}$ as the through Primary Element PEt.

Particularly, the triplet visibility databases are searched for finding through identifiers IDPEt corresponding to the successive Primary Element $PE_{1-U,1}$. The search is further restricted to visibility information associated with the found through identifiers IDPEt that comprise the visible Primary Element $PE_{1-U}$ in the Primary Elements PE within the data file 2010 associated with the found through identifiers IDPEt. Accordingly, the other Primary Element PE within the data file 2010, or tertiary Primary Element $PE_{1-U,2}$ is considered the destination Primary Element PEd of the triplet.

The operation is then iterated until a predetermined evaluation Primary Element PEev is reached as destination Primary Element PEd (as described in the following).

Particularly, at each iteration, firstly (block 2115) the destination Primary Element PEd of the previously identified triplet is considered the through Primary Element PEt of the new triplet, while the through Primary Element PEt of the previously identified triplet is considered the source Primary Element PEs of the new triplet.

Then (block 2120), the triplets databases 1900 are searched in order to identify suitable destination Primary Elements PEd of the triplets as described above.

Afterwards, one or more new triplets are completely identified and it is checked (decision block 2125) whether the destination Primary Elements PEd of the triplets are evaluation Primary Elements PEev.

In a non-limiting embodiment of the invention, two types of evaluation Primary Elements PEev are defined. A first type of evaluation Primary Elements PEev comprises the virtual Primary Elements vPE. Indeed, the virtual Primary Elements vPE operate only as destination Primary Elements PEd, and do not generate any reflected or diffracted ray or rays beam.

A second type of evaluation Primary Elements PEev comprises Primary Elements PE comprising surfaces of buildings. Such Primary Elements are real Primary Elements PE that do not end the propagation of components of the electromagnetic radiation, emitted by the radio Primary Element rPE.

In the negative case (exit branch N of decision block 2125), i.e. an evaluation Primary Element PEev has not been reached, the process returns to block 2115 to determine one or more further triplets (having the destination Primary Element PEd just identified as through Primary Element PEt).

In the affirmative case (exit branch Y of decision block 2125), i.e. an evaluation Primary Element PEev has been reached, it is further checked (decision block 2130) whether the evaluation Primary Element PEev belongs to the first or second type.

In case of an evaluation Primary Element PEev of the first type, i.e. a virtual Primary Element vPE, has been reached (exit branch Y of decision block 2130), the propagation channel is evaluated (block 2135) at the evaluation Primary Element PEev, and the iteration ends, i.e. the evaluation Primary Element PEev of the first type is not considered a through Primary Element PEt of a subsequent triplet.

In case of an evaluation Primary Element PEev of the second type, i.e. a face Primary Element fPE, has been reached (exit branch N of decision block 2130), the propagation channel is evaluated at the evaluation Primary Element PEev and the process returns to block 2115 to determine one or more further triplets (having the evaluation Primary Element PEev as through Primary Element PEt).

The process described above is performed sequentially or preferably, at least partially, in parallel for each visible Primary Element $PE_{1-U}$ directly visible by the radio Primary Element rPE previously identified.

In an embodiment of the invention, the process just described is performed until all the possible visibility paths (i.e., sequences of triplets sharing common Primary Elements PE) originated from the radio Primary Element rPE are analyzed.

At the end of the process, each visibility path followed by components of the electromagnetic radiation propagated by the radio Primary Element rPE and reaching an evaluation Primary Element PEev in the preprocessing area 1510 is investigated and the propagation channel at the reached evaluation Primary Elements PEev is evaluated.

Preferably, a total propagation channel may be evaluated at each considered evaluation Primary Element PEev as a combination (e.g., a sum) of all the components of the electromagnetic radiation propagated by the radio Primary Element rPE reaching the considered evaluation Primary Element PEev through a direct path, one or more reflections, one or more diffraction or a combination of one or more thereof.

This provide an effective and reliable indication of a coverage (i.e., an area over which a Radio Base Station is able to provide radio mobile services) of a radio base station provided in the geographic area 100 at the position defined by the radio Primary Element rPE.

In an embodiment of the invention, in order to reduce a computation time and/or resources requirement of the process, it is considered a reduction of the power of the electromagnetic radiation based on a traveled distance and/or obstacles encountered.

Preferably, a respective weight may be assigned to each typology of interaction between the electromagnetic radiation and a generic Primary Element PE and it is determined a maximum weight allowed the visibility paths.

For example, a maximum weight of five (5) may be set, while the weight for each typology of interaction may be assigned as described in the following Table 1:

TABLE 1

| Interaction | Weight |
|---|---|
| direct | 0 |
| reflection | 2 |
| vertical diffraction | 4 |
| horizontal diffraction | 2 |
| horizontal diffraction on a second edge of the same building | 0 |

Assigning a zero weight to the horizontal diffraction on a second edge of a same building 105 provides a total weight of two (2) for the electromagnetic propagation to propagate beyond a building.

In summary, electromagnetic features (e.g., number and directionality of antennas, emission power, etc.) of the Radio Base Station RBS are combined with, and weighted by, the visibility information (e.g., the visibility paths) associated with the radio Primary Element rPE, for evaluating the propagation channel at the reached evaluation Primary Elements PEev.

Therefore, at the end of each iteration of the above described process the weight of a ray beam reflected or diffracted is updated according to kind of reflection/diffraction occurred to the components of the electromagnetic radiation. The updated weight is compared with the maximum weight, in order to determine whether the process has to be interrupted since the components of the electromagnetic radiation have been weakened by reflections/diffractions to the point of not being useful for providing radio mobile services.

In an embodiment of the invention, the propagation channel of the electromagnetic radiation is evaluated based on the laws of propagation of electromagnetic fields.

Indeed, along the teachings comprised in "Propagation data for the terrestrial land mobile service in the VHF and UHF bands", Recommendation ITU-R P.1145, 1995 already mentioned above, also one or more of the following expedients may be exploited.

For example, a modified electromagnetic propagation in free space relationship is exploited for evaluating the propagation channel at a termination Primary Element. Particularly, considering a distance r of the propagation from the source, the electromagnetic field is considered to be a function of r, such as:

$$(1/r)h, \qquad (7)$$

where h is a parameter having a value generally greater than one (1) such as for example 1.15, 1.2, 1.3, etc. (the value of free space being one).

It should be noted that the distance r in case of reflected and diffracted components of the electromagnetic radiation is preferably considered from the radio Primary Element rPE (i.e., the position of the Radio Base Station RBS) and not simply from the closest Primary Element PE causing reflection/diffraction.

Moreover, the effect of reflection may be evaluated based on the theory of Fresnel. The known Fresnel coefficient (based on incidence angle of incidence ray, polarization of incident ray, and conductivity and dielectric constant associated with the reflection Primary Element PE) is considered in order to determine the effect of the reflection on the reflected components of the electromagnetic radiation.

Finally, the diffraction effect is evaluated based on J. B. Keller, "Geometrical Theory of Diffraction", Journal of the Optical Society of America, vol. 52, n. 5, pp. 116-130, 1962 and R. G. Kouyoumjian, P. H. Pathak, "A Uniform Geometrical Theory of Diffraction for an Edge in a Perfectly Conducting Surface", Proceeding of the IEEE, Vol. 62, N. 11, November 1974 already mentioned above.

In conclusion, the evaluation of propagation channels according to the present invention allows evaluating a coverage of an RBS in the geographic area 100 with a substantially reduction of computational efforts and time. This also allows simulating the deployment or the modification of a radio mobile network within the geographic area 100 substantially faster and with a reduced computational effort.

Further, procedures used for evaluating an optimal deployment of a radio base station suited for operating with known Ray Tracing or RT, and Intelligent Ray Tracing, or IRT techniques may operate with the procedures according to the present invention requiring minimum or no modifications.

It should be noted that the procedures above described might be implemented by a system comprising hardware, firmware, a combination of hardware and software, software.

For example, the system may be implemented on one computing device and/or distributed between two or more computing devices.

Preferably, couple visibility database(s) and triplets visibility database(s) may be stored in computer readable media and/or data storage hardware, accessible by hardware, firmware, a combination of hardware firmware and/or software, software implementing at least one among (preferably all): the generation of the couple visibility database(s) and triplets visibility database(s), the evaluation of propagation channels procedures and the radio communication network planning.

Even though the above description was based on graphic representations of the raster database 200, the polygons 1105, 1115, 1305, 1315, 1405 and 1410, the Primary Elements PE, the preprocessing area 1510 and the reduced preprocessing area 1520, it should further be noted that the system may be configured to perform the whole radio mobile network planning numerically (i.e., without providing any graphic representations). Preferably, the system may be further configured to provide result graphic representations of coverage evaluations for the RBSs and/or for the whole radio mobile network as an output (along with numerical results) for improving a human-readability of the radio mobile network planning.

Figure 22:
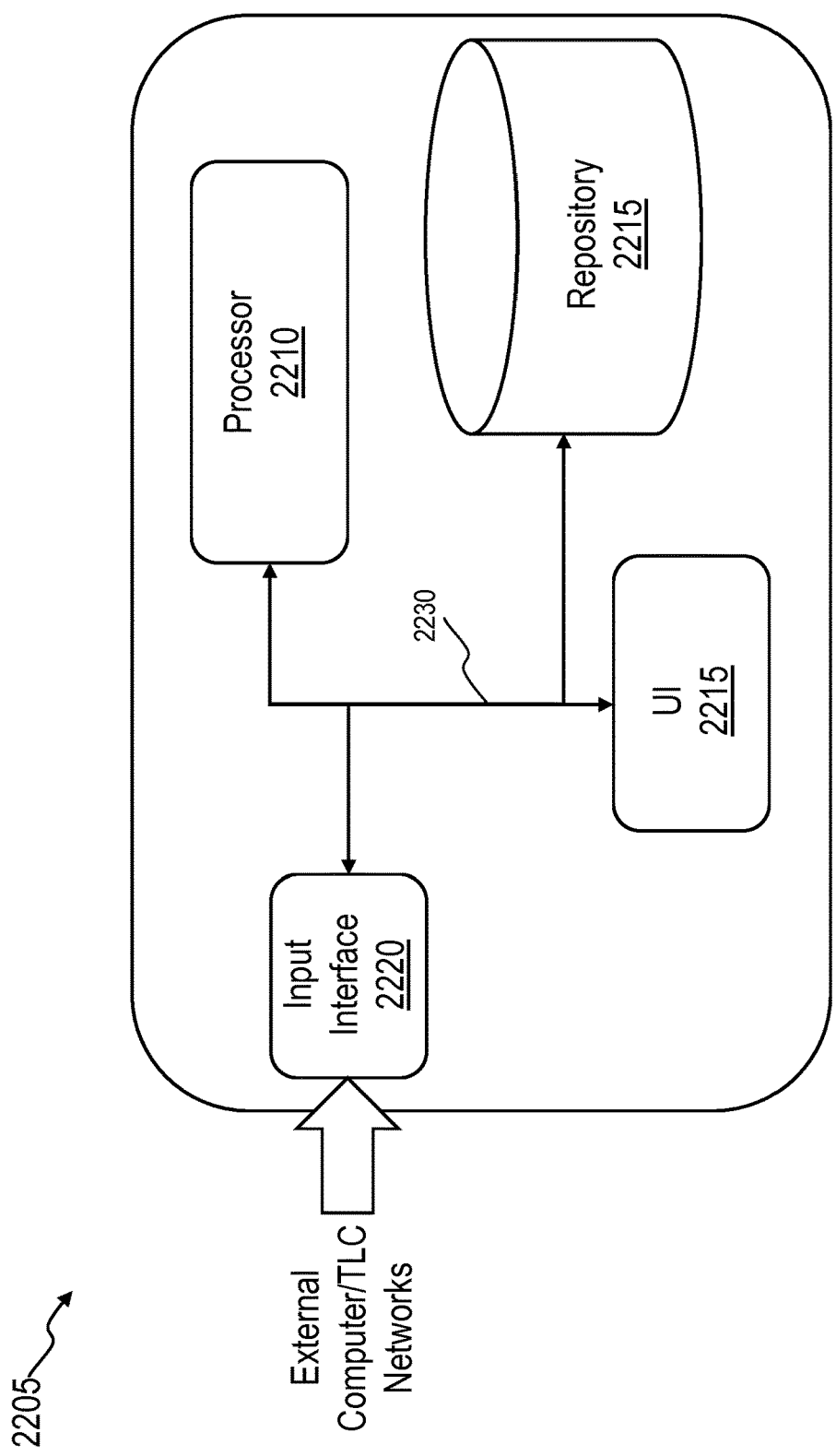
FIG. 22 is schematic representation of a system implementing the radio mobile network planning according to an embodiment of the invention.

A schematic representation of a system 2205 implementing the radio mobile network planning according to an embodiment is shown in FIG. 22.

The system 2205 may comprise, in a non-limiting manner, a processor 2210, a repository 2215, an input interface 2220, and a user interface 2225.

The processor 2210, which may comprise one or more electronic data processing units (e.g., Central Processing Units, or CPUs, Graphic Processing Units, or GPUs, etc.), is configured for processing information on the geographic area 100 providing the raster database 200, generating the databases 1800 and 1900, implementing the procedure 2100 and simulating deployment or of the modification of a radio mobile network within the geographic area 100 according to the present invention.

The repository 2215, which may comprise one or more electronic data storage devices (e.g., one or more volatile and non-volatile memory devices, data centers, etc.), is configured for storing processing information on the geographic area 100 providing the raster database 200, generating the databases 1800 and 1900 and, possibly, any other data (e.g., RBS features) required or generated during the operation of the system 2205.

The input interface 2220, which may comprise one or more communication devices (e.g., modems, router, switch, etc.), is configured for communicating with entities external to the system 2205, such as providers computer networks and/or other communication networks for receiving useful data, such as for example photogrammetry data, data on already existing radio mobile networks, etc.

The user interface, or UI 2225, which may comprise one or more user terminals (i.e., a computer having input/output peripherals allowing human interactions, such as keyboards and displays), is configured for allowing a user of the system 2205 to modify/introduce data (e.g., RBS parameters) in the system 2205 and presenting the results of the system operation 2205 to the user.

Preferably, the processor 2210, the repository 2215, the input interface 2220, and the user interface 2225 are operatively connected one to the other by means of connectors 2230 (e.g., electric wires, cables and/or optic cables) in order to exchange data signals.

In summary, in a first part of the radio mobile network planning according to the present invention geographic data (e.g., the photogrammetry) of the geographic area 100 are acquired and the databases 1800 and 1900, which provide a three-dimensional model of the propagation of electromagnetic radiation in the geographic area 100, are generated.

In a second part of the radio mobile network planning, the one or more triplets visibility databases 1900 (and, possibly, the couples visibility databases 1800) are exploited for simulating one or more radio mobile network deployments in order to find an optimal radio mobile network deployment according to selected criteria (e.g., minimum number of radio base station, coverage, etc.). Particularly, the simulation of one or more radio mobile network deployments comprises evaluating the propagation channel provided by radio base stations positioned at predetermined location according to the procedure 2100 described above.

It should be noted that the second part of the radio mobile network planning may be implemented in a plurality of instances based on the results (i.e., the databases 1800 and 1900) of a single (initial) implementation of the first part of the radio mobile network planning.

Moreover, a periodic or aperiodic update process of the databases 1800 and 1900 may be implemented for modifying the three-dimensional model of the geographic area 100 according to changes occurred in the geographic area 100 (e.g., provision of new buildings, demolition or structural changes of existing buildings, etc.) without requiring a whole re-calculation of the databases 1800 and 1900.

The invention claimed is:

1. A method of planning deployment of a radio communication network in at least one portion of a geographic area, the radio communication network comprising at least one radio base station configured to provide radio communication services, the method comprising:
   providing a three-dimensional model of the at least one portion of the geographic area;
   providing a model of the at least one radio base station, the model comprising at least an indication of a position of the radio base station within the geographic area;
   evaluating a propagation channel within the at least one portion of the geographic area associated with electromagnetic radiation, radiated by the at least one radio base station, at predetermined positions in the three-dimensional model of the geographic area,
   wherein providing the three-dimensional model of the at least one portion of the geographic area comprises:
      determining a first threshold distance accounting for a maximum distance within which reflected electromagnetic radiation allows providing radio communication services;
      determining a second threshold distance accounting for a maximum distance within which diffracted electromagnetic radiation allows providing radio communication services;
      dividing the at least a portion of the geographic area in a plurality of basic parcels, each basic parcel having a size based on at least one among the first threshold distance and the second threshold distance;
      subdividing the three-dimensional model of the geographic area to obtain a plurality of Primary Elements, each Primary Element comprising at least one indication of a position of the Primary Element within the at least one portion of the geographic area, and
      identifying triplets of Primary Elements in the plurality of Primary Elements, based on geometrical visibility among Primary Elements, each triplet of Primary Elements comprising a source Primary Element acting as a source of electromagnetic radiation, a destination Primary Element acting as a destination of electromagnetic radiation, and an intermediate Primary Element, the intermediate Primary Element:
         receiving the electromagnetic radiation generated by the source Primary Element, and
         interacting with the received electromagnetic radiation, wherein the interacting causes electromagnetic radiation to propagate from the intermediate Primary Element to the destination Primary Element; and
   planning the deployment of the radio communication network based on the evaluation of the propagation channel.

2. The method according to claim 1, wherein identifying triplets of Primary Elements comprises:
   identifying, as the intermediate Primary Element of a triplet, a Primary Element having a direct geometrical visibility with the source Primary Element,
   evaluating geometrical optics interactions between electromagnetic radiation emitted by the source Primary Element and the intermediate Primary Element, and
   identifying, as the destination Primary Element of a triplet, a Primary Element having a direct geometrical visibility with the intermediate Primary Element and reached by the electromagnetic radiation propagating from the intermediate Primary Element and resulting from the geometrical optics interactions between the intermediate Primary Element and the electromagnetic radiation received from the source Primary Element.

3. The method according to claim 2, wherein evaluating geometrical optics interactions between electromagnetic radiation emitted by the source Primary Element and the intermediate Primary Element comprises one of:
   evaluating a reflection of electromagnetic radiation emitted by the source Primary Element and reaching the intermediate Primary Element, and
   evaluating a diffraction of electromagnetic radiation emitted by the source Primary Element and reaching the intermediate Primary Element.

4. The method according to claim 1, wherein dividing the at least a portion of the geographic area in a plurality of basic parcels comprises selecting lengths of first and second sides of the basic parcels according to:

$$\Delta x > \mathrm{MAX}(de, dr), \text{ and}$$

$$\Delta y > \mathrm{MAX}(de, dr),$$

wherein $\Delta x$ is a length of the first side of the basic parcel, $\Delta y$ is a length of the second side of the basic parcel, dr is the first threshold distance and de is the second threshold distance.

5. The method according to claim 4, wherein selecting the lengths of the first and second sides of the basic parcels further comprises checking whether the first and second sides are longer than a third threshold distance, and
   in an affirmative case, maintaining the selected lengths of the first and second sides, and
   in a negative case, setting the lengths of the first and second sides equal to the third threshold distance.

6. The method according to claim 1, wherein identifying triplets of Primary Elements based on geometrical visibility among Primary Elements further comprises:

determining a reduced preprocessing area comprising a first basic parcel comprising the source Primary Element of a triplet and second basic parcels adjacent to the first basic parcel, and wherein identifying triplets of Primary Elements based on geometrical visibility among Primary Elements comprises identifying triplets of Primary Elements within the reduced preprocessing area.

7. The method according to claim 1, wherein providing a three-dimensional model of the at least a portion of the geographic area further comprises:

providing a raster database built through an automatic interpretation process applied to imaging data of the geographic area, the raster database comprising information about artefacts within the at least one portion of the geographic area.

8. The method according to claim 7, wherein the raster database comprises a plurality of artefact elements and non-artefacts elements, and wherein providing a three-dimensional model of the at least a portion of the geographic area further comprises:
identifying a cluster of artefact elements as an artefact within the at least one portion of the geographic area, the artefact interacting with electromagnetic radiation.

9. The method according to claim 8, wherein providing a raster database comprises filtering the raster database for separating the clusters of artefact elements one from another by one or more non-artefact elements.

10. The method according to claim 8, wherein providing a three-dimensional model of the at least a portion of the geographic area further comprises:

for each cluster of artefact elements, defining a polygon corresponding to a perimeter defined by the cluster of artefact elements.

11. The method according to claim 10, wherein providing a three-dimensional model of the at least a portion of the geographic area further comprises:

for each cluster of artefact elements, identifying a candidate polygon fitting the polygon, the candidate polygon being defined according to one among:
a combinatory criterion, the combinatory criterion providing a quadrangular candidate polygon sharing vertices with the polygon;
a pattern recognition criterion, the pattern recognition criterion selecting a candidate polygon from a plurality of preformed polygonal shapes; and
a directional criterion, the directional criterion providing a candidate polygon generated in such a way that each vertex of the candidate polygon corresponds to a vertex of the polygon at which a substantial change in an average orientation of sides of the polygon is detected.

12. The method according to claim 11, wherein identifying a candidate polygon fitting the polygon further comprises, for each polygon:
defining a plurality of candidate polygons,
evaluate a quality of each candidate polygon of the plurality of candidate polygons as $$Q = \frac{X \cap Y}{X \cup Y},$$

where Q is the quality of the candidate polygon, Y is a surface area of the candidate polygon and X is a surface area of the polygon, and
identifying, as the candidate polygon fitting the polygon, the candidate polygon associated with the highest quality.

13. The method according to claim 12, wherein defining a plurality of candidate polygons, for each polygon comprises:
defining the plurality of candidate polygons according to at least two criteria among the combinatory criterion, the pattern recognition criterion and the directional criterion, and
wherein identifying, as the candidate polygon fitting the polygon, the polygon associated with the highest quality comprises:
identifying a criterion-specific candidate polygon associated with the highest quality among the candidate polygons defined according to each one of the at least two criteria,
identifying as the candidate polygon fitting the polygon the criterion-specific candidate polygon associated with the highest quality.

14. The method according to claim 1, wherein providing a model of the at least one radio base station comprises:
defining a radio Primary Element according to an indication of a position of the radio base station within the geographic area, and
wherein evaluating a propagation channel comprises:
identifying Primary Elements having a direct geometric visibility with the radio Primary Element, and
for each Primary Element having a direct geometric visibility with the radio Primary Element, identifying triplets of Primary Elements based on geometrical visibility among Primary Elements, each triplet comprising the radio Primary Element acting as a source of electromagnetic radiation, the destination Primary Element, and the Primary Element having a direct geometric visibility with the radio Primary Element as the intermediate Primary Element.

15. The method according to claim 14, wherein evaluating a propagation channel further comprises:
iteratively searching the triplets of Primary Elements identified based on geometrical visibility among Primary Elements for identifying further triplets of Primary Elements, each further triplet of Primary Elements comprising:
a further source Primary Element corresponding to a previous intermediate Primary Element, being the intermediate Primary Element of a previously identified triplet of Primary Elements identified in a previous iteration;
a further intermediate Primary Element corresponding to a previous destination Primary Element, being the destination Primary Element of the previously identified triplet of Primary Elements; and
a further destination Primary Element.

16. The method according to claim 15, wherein providing a model of the at least one radio base station comprises:
providing at least an indication of electromagnetic radiation features of the at least one radio base station, and
wherein defining a plurality of Primary Elements further comprises:
for each Primary Element, providing an indication of a type of Primary Element, and
wherein evaluating a propagation channel further comprises:

evaluating the propagation channel at destination Primary Elements belonging to one or more predetermined types.

17. A system for planning deployment of a radio communication network in at least a portion of a geographic area, the radio communication network comprising at least one radio base station configured to provide radio communication services, the system comprising hardware, firmware, a combination of hardware and software, or software configured for implementing the method according to claim 1.

18. The system according to claim 17, comprising:
a processor configured for implementing the method, and
a repository configured for storing data, the repository being operatively coupled with the processor, and
wherein, for each triplet of Primary Elements, the repository stores:
  at least one data file comprising an indication of the source Primary Element acting as source of electromagnetic radiation and of the destination Primary Element acting as destination of electromagnetic radiation of the triplet of Primary Elements, and
  at least one indexing file comprising an indication of the intermediate Primary Element of the triplet of Primary Elements receiving the electromagnetic radiation generated by the source Primary Element and propagating electromagnetic radiation to the destination Primary Element, and a position within the at least one data file of the indication of the source Primary Element and of the destination Primary Element of the triplet of Primary Elements.

* * * * *